US011804917B2

(12) United States Patent
Zhao et al.

(10) Patent No.: US 11,804,917 B2
(45) Date of Patent: Oct. 31, 2023

(54) ELECTRONIC DEVICE AND METHOD FOR WIRELESS COMMUNICATION, AND COMPUTER READABLE STORAGE MEDIUM

(71) Applicant: Sony Group Corporation, Tokyo (JP)

(72) Inventors: Youping Zhao, Beijing (CN); Cong Lu, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/775,315

(22) PCT Filed: Dec. 3, 2020

(86) PCT No.: PCT/CN2020/133484
§ 371 (c)(1),
(2) Date: May 9, 2022

(87) PCT Pub. No.: WO2021/115184
PCT Pub. Date: Jun. 17, 2021

(65) Prior Publication Data
US 2022/0416920 A1    Dec. 29, 2022

(30) Foreign Application Priority Data

Dec. 10, 2019    (CN) .......................... 201911261089.6

(51) Int. Cl.
*H04B 17/336* (2015.01)
*H04B 17/382* (2015.01)
*H04W 16/14* (2009.01)

(52) U.S. Cl.
CPC ......... *H04B 17/336* (2015.01); *H04B 17/382* (2015.01); *H04W 16/14* (2013.01)

(58) Field of Classification Search
CPC ........................... H04B 17/336; H04B 17/382
See application file for complete search history.

(56) References Cited

U.S. PATENT DOCUMENTS

| 2005/0285766 | A1* | 12/2005 | San ........................ | H03M 3/34 |
| | | | | 341/143 |
| 2006/0031082 | A1* | 2/2006 | Amaitis ............... | G06Q 50/188 |
| | | | | 705/80 |

(Continued)

FOREIGN PATENT DOCUMENTS

| CN | 109447740 A | 3/2019 |
| CN | 110300155 A | 10/2019 |
| CN | 110519766 A | 11/2019 |

OTHER PUBLICATIONS

International Search Report and Written Opinion dated Mar. 4, 2021, received for PCT Application PCT/CN2020/133484, Filed on Dec. 3, 2020, 9 pages including English Translation.

*Primary Examiner* — Zhiren Qin
(74) *Attorney, Agent, or Firm* — XSENSUS LLP

(57) ABSTRACT

Provided in the present disclosure are an electronic device and a method for wireless communication, and a computer-readable storage medium, the electronic device for wireless communication comprising a processing circuit, the processing circuit configured such that: if it is determined that the electronic device is in a frequency spectrum transaction verification region, verifying an effectiveness of a frequency spectrum transaction, the verification region being determined on the basis of interference generated when a frequency spectrum acquirer in the frequency spectrum transaction uses the transaction frequency spectrum; determining an electronic device signal-to-noise ratio according to interference of the electronic device when the frequency spectrum acquirer uses the transaction frequency spectrum, and if the signal-to-noise ratio is greater than a preset signal-to- (Continued)

noise ratio threshold configured for the electronic device, verifying that the frequency spectrum transaction is in effect.

19 Claims, 21 Drawing Sheets

(56) References Cited

U.S. PATENT DOCUMENTS

2017/0142736 A1\* 5/2017 Liu ...................... H04W 16/14
2019/0340013 A1   11/2019 Celia
2022/0416920 A1\* 12/2022 Zhao .................... H04B 17/336

\* cited by examiner

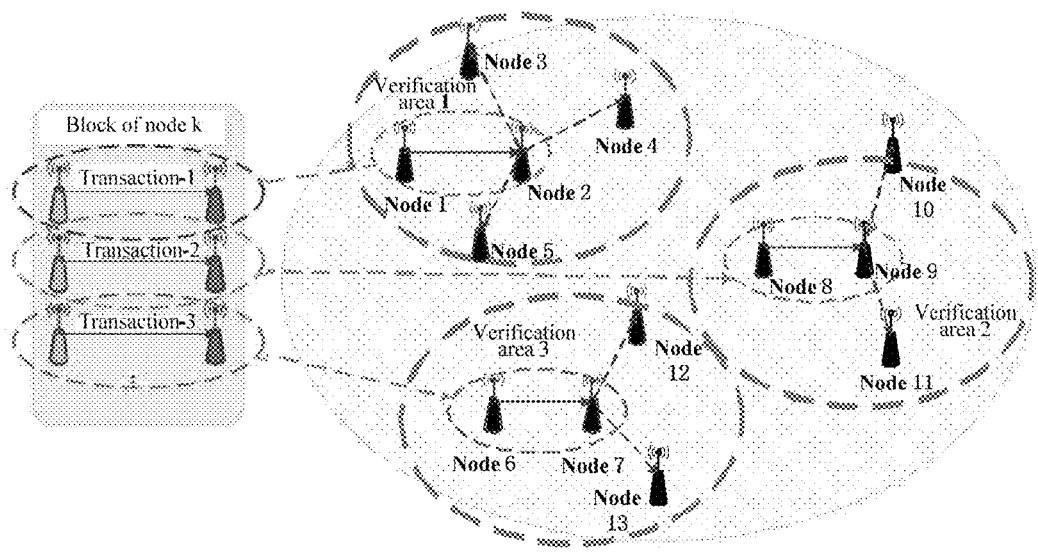

Figure 7

| Transaction number | Seller | Buyer | Transacted spectr-um | Transaction price (spectrum coin) | Historical credit value of a transaction party | Size of a verification area of the transaction (m) | Position of a buyer | Transmission power of the buyer(dBm) | The total number of spectrums held by the transaction party (channel) |
|---|---|---|---|---|---|---|---|---|---|
| 1 | Bob | Alice | 4 | 1.2 | 0.75 | 800 | $(x_2, y_2)$ | 10 | 8 |
| 2 | .. | .. | ... | ... | ... | ... | ... | ... | ... |
| | | | Basic transaction information | | | | | Optional transaction information | |

Figure 8

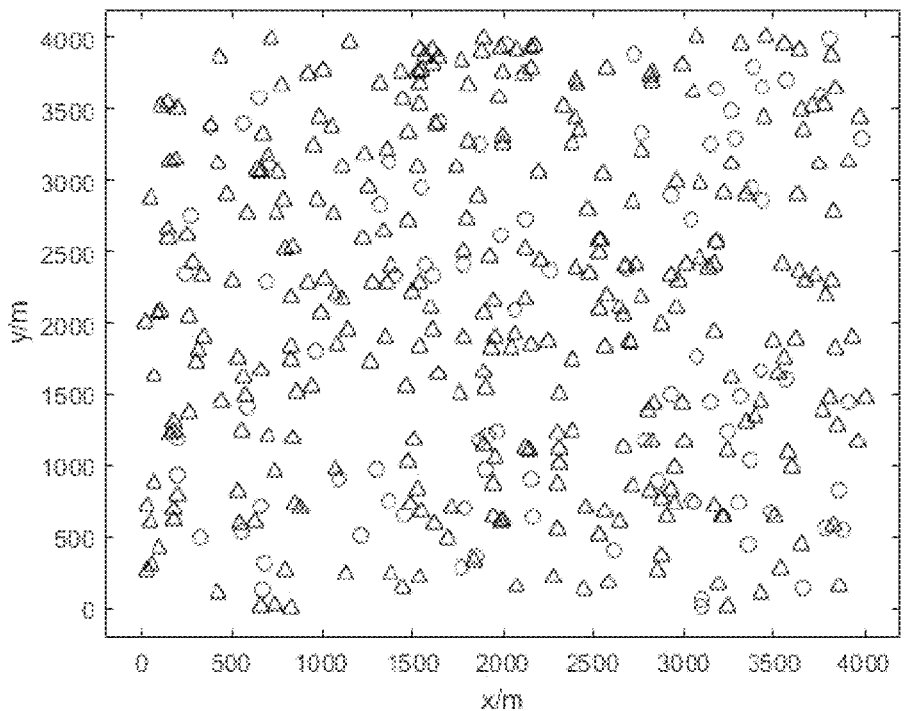

Figure 10

| Parameter | Parameter value |
|---|---|
| Operating frequency | 3.6GHz |
| Simulation areas | 4km×4km |
| Channel model | AWGN |
| Pre-determined interference threshold set for the spectrum transaction | -96 dBm |
| Noise base | -107dBm |
| Signal to interference plus noise ratio threshold | 20 dB |
| The total number of nodes | 200~4000 |
| Proportion of active nodes | 0.4, 0.6 |
| The total number of nodes of a spectrum acquirer | 80~1600 |
| Service radius of nodes | 10 m |
| Transmission power | 10, 20 dBm |
| Path loss coefficient | 2.5, 3.0, 3.5 |
| The total number of spectrums held by the node (channel) | 0~8 |

Figure 11

ELECTRONIC DEVICE AND METHOD FOR WIRELESS COMMUNICATION, AND COMPUTER READABLE STORAGE MEDIUM

CROSS-REFERENCE TO RELATED APPLICATIONS

This application is based on PCT/CN2020/133484 filed on Dec. 3, 2020, which claims the priority to Chinese Patent Application No. 201911261089.6 titled "ELECTRONIC DEVICE AND METHOD FOR WIRELESS COMMUNICATION, AND COMPUTER READABLE STORAGE MEDIUM", filed on Dec. 10, 2019 with the China National Intellectual Property Administration (CNIPA), the entire contents of each are incorporated herein by reference in its entirety.

FIELD

The present disclosure relates to the technical field of wireless communication, and in particular to processing of spectrum transaction. In more particularly, the present disclosure relates to an electronic device and method for wireless communication, and a computer readable storage medium.

BACKGROUND

With the rapid development of the wireless technology, available electromagnetic spectrums become increasingly crowded. In fact, a series of reports and spectrum measurement results indicate that utilization of some authorized spectrums (such as television and broadcasting frequency band) is low. In recent years, the technology of dynamic spectrum access (DSA) based on cognitive radio becomes research focus, providing a new path for improving spectrum utilization.

According to the dynamic spectrum access, information transmission service is provided for a secondary user (SU) by utilizing vacant spectrum. That is, the secondary user accesses to a channel when a primary user (PU) does not use the channel, and the secondary user has to yield the channel when the primary user reoccupies the channel. The secondary user accesses to the idle channel at appropriate time, so that the spectrum utilization is greatly improved and waste of spectrum is reduced. Therefore, the dynamic spectrum access is a core technology for solving spectrum distribution problem in a next generation of mobile communication.

In view of this, a spectrum management system for managing spectrum transaction becomes a current research focus.

SUMMARY

A brief summary of embodiments of the present disclosure is given in the following, so as to provide basic understanding on some aspects of the present disclosure. It should be understood that, the summary is not an exhaustive summary of the present disclosure. The summary is neither intended to determine key or important parts of the present disclosure, nor intended to limit the scope of the present disclosure. An object of the summary is to provide some concepts in a simplified form, as preamble of a detailed description later.

According to an aspect of the present disclosure, an electronic device for wireless communication is provided. The electronic device includes a processing circuit configured to: verify validity of a spectrum transaction if it is determined that the electronic device is located in a validation area of the spectrum transaction, where the validation area is determined based on an interference caused by a spectrum acquirer in the spectrum transaction when using the transacted spectrum; and determine a signal to interference plus noise ratio of the electronic device based on an interface of the spectrum acquirer when using the transacted spectrum to the electronic device, and verify the spectrum transaction to be valid in a case that the signal to interference plus noise ratio is greater than a pre-determined signal to interference plus noise ratio threshold set for the electronic device.

According to an aspect of the present disclosure, a base station for wireless communication is provided. The base station includes the electronic device described above.

According to an aspect of the present disclosure, a user equipment for wireless communication is provided. The user equipment includes the electronic equipment described above.

According to an aspect of the present disclosure, a method for wireless communication is provided. The method includes: causing an electronic device to verify validity of a spectrum transaction if it is determined that the electronic device is located in a validation area of the spectrum transaction, where the validation area is determined based on an interference caused by a spectrum acquirer in the spectrum transaction when using the transacted spectrum; and determining a signal to interference plus noise ratio of the electronic device based on an interference of the spectrum acquirer when using the transacted spectrum to the electronic device, and verifying the spectrum transaction to be valid in a case that the signal to interference plus noise ratio is greater than a pre-determined signal to interference plus noise ratio threshold set for the electronic device.

According to another aspect of the present disclosure, a computer program code and a computer program product for implementing the above method for wireless communication, and a computer readable storage medium recording the computer program code for implementing the method for wireless communication are further provided.

These and other advantages of the present disclosure will become more apparent with reference to detailed illustration of preferred embodiments of the present disclosure in conjunction with the drawings.

BRIEF DESCRIPTION OF THE DRAWINGS

In order to further illustrate the above and other advantages and characteristics of the present disclosure, specific embodiments of the present disclosure are further described in detail below with reference to the drawings. The drawings together with the following detailed description are included in and form a part of this specification. Elements having the same function and structure are represented by the same reference numerals. It should be understood that these drawings show only typical examples of the present disclosure and should not be considered as limiting the scope of the present disclosure. In the drawings:

FIG. 7 shows an example of a verification area according to an embodiment of the present disclosure;

FIG. 8 shows an example of information of spectrum transaction according to an embodiment of the present disclosure;

FIG. 10 is a diagram showing a simulation scene of a spectrum management system according to an embodiment of the present disclosure;

FIG. 11 shows parameter setting of a simulation scene of the spectrum management system according to an embodiment of the present disclosure;

DETAILED DESCRIPTION OF EMBODIMENTS

Exemplary embodiments of the present disclosure are described below with reference to the drawings. For clarity and conciseness, not all characteristics of an actual embodiment are described in the specification. However, it should be understood that many embodiment-specific decisions, for example, conforming to restrictions related to system and business, must be made when developing any actual embodiment, so as to achieve a specific goal of a developer. These restrictions may vary depending on embodiments. In addition, it should be understood that, although development work may be complex and time-consuming, the development work is merely a routine task for those skilled in the art who benefit from the present disclosure.

Here, it should be further noted that, in order to avoid obscuring the present disclosure due to unnecessary details, the drawings show only apparatus structures and/or processing steps that are closely related to technical solutions of the present disclosure, and other details have little relevance to the present disclosure are omitted.

Figure 1:
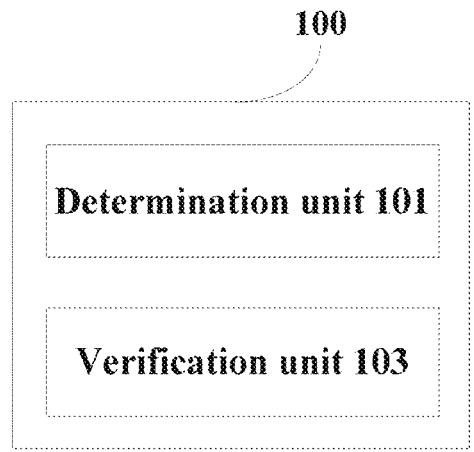
FIG. 1 is a block diagram showing functional modules of an electronic device for wireless communication according to an embodiment of the present disclosure.

FIG. 1 is a block diagram of functional modules of an electronic device 100 for wireless communication according to an embodiment of the present disclosure. As shown in FIG. 1, the electronic device 100 includes a determination unit 101 and a verification unit 103. The determination unit 101 is configured to verify validity of spectrum transaction if it is determined that the electronic device 100 is located in a verification area of the spectrum transaction. The verification area is determined based on an interference caused by a spectrum acquirer in the spectrum transaction when using the transacted spectrum. The verification unit 103 is configured to determine a signal to interference plus noise ratio of the electronic device 100 according to the interference of the spectrum acquirer when using the transacted spectrum to the electronic device 100, and verify the spectrum transaction to be valid in a case that the signal to interference plus noise ratio is greater than a pre-determined signal to interference plus noise threshold set for the electronic device 100.

The determination unit 101 and the verification unit 103 may be implemented by one or more processing circuits. The processing circuit may be implemented as a chip.

The electronic device 100 may be arranged at a user equipment (UE) side or may be communicatively connected to the UE. Here, it should be noted that, the electronic device 100 may be implemented as a chip or implemented as an apparatus. For example, the electronic device 100 may function as the user equipment, and may include external devices such as a memory and a transceiver (not shown). The memory may be configured to store program required for implementing various functions by the user equipment, and related data information. The transceiver may include one or more communication interfaces to support communication with different devices (such as, a base station and other user equipment). Implementation of the transceiver is not limited here. For example, the user equipment may be a mobile phone, a vehicle-mounted navigation device and a router.

In addition, the electronic device 100 may be arranged at a base station side or may be communicatively connected to a base station. For example, the electronic device 100 may function as the base station, and may include external device such as a memory and a transceiver (not shown). The memory may be configured to store programs required for implementing various functions by the base station and related data information. The transceiver may include one or more communication interfaces to support communication with different devices (for example, a user equipment and other base station). Implementation of the transceiver is not limited here. In an example, the electronic device 100 may be an access device and a hotspot device.

It should be understood by those skilled in the art that the electronic device 100 may be implemented in other forms, as long as the electronic device 100 has calculation capability and transceiving capability.

The spectrum transaction may result in transferring of spectrum attribution, and may result in harmful interference on other electronic device in a same channel with the transacted spectrum. Therefore, the spectrum transaction is required to be verified. However, an electronic device located beyond the verification area suffers a little interference or no interference from the spectrum acquirer when using the transacted spectrum. If such electronic device is verified, a system overhead is increased.

According to the embodiment of the present disclosure, only in a case that the electronic device 100 is located in the verification area of the spectrum transaction, the electronic device 100 verifies the spectrum transaction, and in a case that the electronic device 100 is not located in the verification area of the spectrum transaction, the electronic device 100 does not verify the spectrum transaction. Therefore, the system overhead required by verifying the spectrum transaction can be reduced, and the number of electronic device for verifying the spectrum transaction can be decreased, thereby improving the verification efficiency. In addition, the electronic device 100 verifies the spectrum transaction to be valid only in a case that a signal to interference plus noise ratio of the electronic device 100 when the spectrum acquirer uses the transacted spectrum is greater than a pre-determined signal to interference plus noise ratio threshold. Therefore, the interference to the electronic device 100 from the spectrum transaction can be efficiently reduced, thereby improving the system performance significantly (for example, improving the signal to interference plus noise ratio of the electronic device).

In an example, the verification area is an area in which the interference caused when the spectrum acquirer uses the transacted spectrum is greater than a pre-determined interference threshold set for the spectrum transaction.

A size of the verification area depends on multiple factors. In an example, the verification area is determined based on the interference caused when the spectrum acquirer uses the transacted spectrum and the pre-determined interference threshold set for the spectrum transaction.

In an example, if the spectrum transaction is an i-th spectrum transaction (i is a positive integer), a verification area $S_V$ of the i-th spectrum transaction is determined according to the following equation (1):

$$S_V = S(I > I_{th}^i) \tag{1}$$

In which, I represents interference caused when the spectrum acquirer in the i-th spectrum transaction uses the transacted spectrum, $I_{th}^i$ represents a pre-determined interference threshold set for the i-th spectrum transaction, $S(I > I_{th}^i)$ represents an area in which the interference caused when the spectrum acquirer in the i-th spectrum transaction uses the transacted spectrum is greater than the pre-determined interference threshold set for the i-th spectrum transaction.

Only in a case that the electronic device 100 is located in the verification area in which the interference caused when the spectrum acquirer uses the transacted spectrum is greater than the pre-determined interference threshold, the electronic device 100 verifies the spectrum transaction. Therefore, the system overhead required by verifying the spectrum transaction can be reduced, and the number of the electronic device for verifying the spectrum transaction can be decreased, thereby improving the verifying efficiency.

In an example, the verification area is a circular area of which a center is the spectrum acquirer, and a radius of the circular area is calculated based on transmission power information of the spectrum acquirer included in information of the spectrum transaction and the pre-determined interference threshold.

In an example, the transmission power information of the spectrum acquirer may include a transmission power and a transmission gain of the spectrum acquirer.

In an example, in a case that the verification area is a circular area of which a center is a spectrum acquirer of the i-th spectrum transaction, a radius $R_i$ of the verification area of the i-th spectrum transaction may be calculated according to the following equation (2):

$$R_i = \frac{\lambda}{4\pi} \sqrt[\alpha]{\frac{P_{Tx} \cdot G_{Tx}}{I_{th}^i}} \tag{2}$$

In which, $P_{Tx}$ and $G_{Tx}$ respectively represent a transmission power and a transmission gain of the spectrum acquirer of the i-th spectrum transaction, $I_{th}^i$ represents the pre-determined interference threshold set for the i-th spectrum transaction, $\alpha$ represents a path loss coefficient, and $\lambda$ represents a wavelength of a spectrum transacted in the i-th spectrum transaction.

The radius of the verification area is calculated based on the transmission power information of the spectrum acquirer included in the information of the spectrum transaction, thereby calculating a range of interferences to the electronic device from the spectrum acquirer when using the transacted spectrum more accurately.

Those skilled in the art may conceive other methods for calculating the radius of the verification area, and the methods are not repeated herein.

In an example, the verification unit 103 may be configured to calculate a distance between the spectrum acquirer and the electronic device 100 based on position information of the spectrum acquirer and position information of the electronic device 100, and calculate an interference to the electronic device 100 from the spectrum acquirer based on the distance and the transmission power information of the spectrum acquirer.

If di represents the distance between the spectrum acquirer of the i-th spectrum transaction and the electronic device 100 calculated based on position information of the electronic device 100 and position information of the spectrum acquirer, interference Ii to the electronic device 100 from the spectrum acquirer when using the transacted spectrum may be calculated according to the following equation (3):

$$I_i = P_{Tx} \cdot G_{Tx} \cdot \left(\frac{\lambda}{4\pi d_i}\right)^\alpha \tag{3}$$

In which, $P_{Tx}$ and $G_{Tx}$ respectively represent a transmission power and a transmission gain of the spectrum acquirer of the i-th spectrum transaction, $\alpha$ represents a path loss coefficient, and $\lambda$ represents a wavelength of a spectrum transacted in the i-th spectrum transaction.

The signal to interference plus noise ratio $SINR_i$ of the electronic device 100 may be calculated according to the following equation (4):

$$SINR_i = \frac{P_{Rx}}{I_i + N_0} \tag{4}$$

In which, $P_{Rx}$ represents a receiving power of the electronic device 100, and $N_0$ represents a noise power.

It is assumed that the pre-determined signal to interference plus noise ratio threshold set for the electronic device 100 is represented as $SINR_{th}$. In a case that the signal to interference plus noise ratio $SINR_i$ is greater than the pre-determined signal to interference plus noise ratio threshold $SINR_{th}$, the electronic device 100 verifies the i-th spectrum transaction to be valid.

In an example, the electronic device 100 sets the pre-determined signal to interference plus noise ratio threshold according to its QoS requirement. The electronic device 100 may have different types, such as a base station and a terminal user, so QoS requirements for different types of electronic device are different. Therefore, different electronic devices may have different pre-determined signal to interference plus noise ratio thresholds. In an example, the pre-determined signal to interference plus noise ratio threshold may be set according to capability of the electronic device 100 for bearing harmful interference and/or a modulation mode.

In an example, the verification unit 103 may be configured to calculate a credit value of the spectrum acquirer and a spectrum provider as transaction party of the spectrum transaction, and verify validity of the spectrum transaction in a case that the credit value of the transaction party is greater than a pre-determined credit threshold.

The electronic device 100 may calculate the credit value of the spectrum acquirer and the spectrum provider to ensure that identities of the spectrum acquirer and the spectrum provider and information provided by the spectrum acquirer and the spectrum provider are credible. The electronic device 100 verifies the spectrum transaction in a case that the credit value of the spectrum transaction party is greater than the credit threshold, thereby ensuring safety and reliability of the spectrum transaction and thus further reducing the system overhead required for verifying the spectrum transaction.

In an example, the verifying unit 103 may be configured to calculate the credit value of the transaction party based on at least one of historical transaction information of the transaction party, the total number of spectrums held by the transaction party and information of the transaction party provided in the information of the spectrum transaction. The credit value of the transaction party is decreased due to bad transaction recording in the historical transaction information. In a case that no bad transaction recording is included in the historical transaction information, the credit value of the transaction party is larger as a historical credit value in the historical transaction information is larger, the credit value of the transaction party is larger as the total number of spectrums held by the transaction party is larger, and the credit value of the transaction party is larger as the number and/or types of the transaction party information is larger. The transaction party information includes at least one of position information, transmission power information and information about the held spectrum of the transaction party.

Description is provided by taking the credit value of the spectrum acquirer as an example hereinafter. The description of the credit value of the spectrum acquirer also adapts to the spectrum provider.

In an example, the historical transaction information may include the historical credit value and the historical transaction record of the spectrum acquirer. A current credit value of the spectrum acquirer may be calculated according to the historical credit value of the spectrum acquirer and whether there being any bad recording. For example, the bad transaction recording may include: dual payment recording, the recording of maliciously tampering transaction information and so on. Those skilled in the art may conceive other examples of the bad transaction recording, which are not described herein.

The credit value related to the historical transaction information is referred to as a credit value $\rho_R$ based on historical transaction information, which may be calculated according to the following equation (5), illustratively rather than restrictively:

$$\rho_R = \begin{cases} k_1 R + b_1 & \text{bad recording exists} \\ k_2 R + b_2 & R < R_{th} \\ 1 & R \geq R_{th} \end{cases} \tag{5}$$

In which, R represents the historical credit value, $k_1$, $k_2$, $b_1$ and $b_2$ represent respectively adjustable coefficients, and $R_{th}$ represents a threshold of the historical credit value of the spectrum acquirer. In an example, $k_1$, $k_2$, $b_1$ and $b_2$ may be adjusted according to experience, and $R_{th}$ may be set according to experience.

Figure 2:
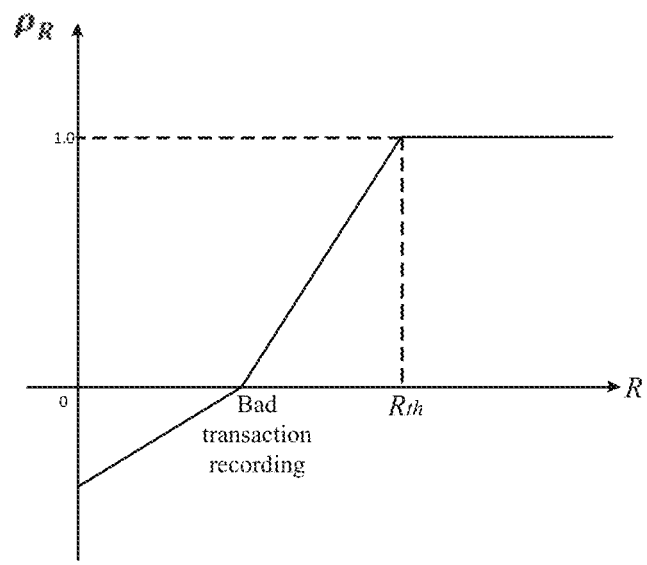
FIG. 2 is a diagram showing a relationship between a credit value based on historic transaction information and a historical credit value.

FIG. 2 is a diagram showing a relationship between the credit value $\rho_R$ based on historical transaction information and the historical credit value R. In FIG. 2, in a case that bad transaction recording is included in the historical transaction information, $\rho_R$ is negative; and in a case that no bad transaction recording is included in the historical transaction information, $\rho_R$ is positive. In a case that the historical credit value R is less than the threshold $R_{th}$, $\rho_R$ is increased with increasing of the historical credit value R; and $\rho_R$ reaches a maximum value 1.0 in a case that the historical credit value R is greater than or equal to the threshold $R_{th}$.

The credit value related to the total number of spectrums held by the spectrum acquirer is referred to as the credit value $\rho_{BW}$ based on the total number of spectrums. Transaction of an incredible node is determined to be invalid, and the incredible node is not allowed to compete for an accounting right, therefore, a cost of "lying" is larger for a node of which the held total number of spectrums is larger. Thus, the node of which the held total number of spectrums is larger has a greater credit value. That is, $\rho_{BW}$ is increased as the total number of spectrums held by the spectrum acquirer is increased.

Illustratively rather than restrictively, $\rho_{BW}$ may be calculated according to the following equation (6):

$$\rho_{BW} = \left( \frac{2}{1 + \exp[-\sigma_{BW} \cdot (BW - BW_m^o)]} - 1 \right) \cdot 0.5 + 0.5. \quad (6)$$

In which, BW represents the total number of spectrums held by the spectrum acquirer, $\sigma_o$ and BW are adjustable contants. In an example, $\sigma_o$ and BW may be adjusted according to experience.

Figure 3:
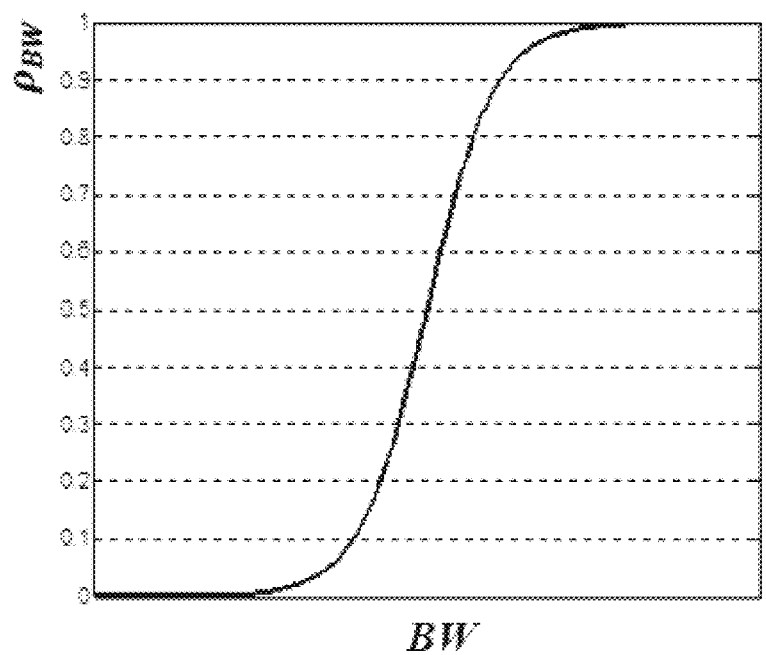
FIG. 3 is a diagram showing a relationship between a total number of spectrums held by a spectrum acquirer and a credit value based on the total number of spectrums.

FIG. 3 is a diagram showing a relationship between the total number of spectrums BW held by the spectrum acquirer and the credit value $\rho_{BW}$ based on the total number of spectrums. As shown in FIG. 3, the credit value $\rho_{BW}$ based on the total number of spectrums is increased with increasing of the total number of spectrums held by the spectrum acquirer, until reaching the maximum value 1.0.

In a case that the transaction party is the spectrum acquirer, the transaction party information is the spectrum acquirer information. The spectrum acquirer information may include at least one of position information, the transmission power information and information about the held spectrum of the spectrum acquirer. In an example, information about the held spectrum refers to information about the held spectrums in total. The credit value related to the spectrum acquirer information is referred to a credit value $\rho_\varepsilon$ based on information. $\rho_\varepsilon$ is higher as more information is provided by the spectrum acquirer and the type of the information is more important. Different $\rho_\varepsilon$s may be obtained by combining different types of information. A value of $\rho_\varepsilon$ for each information combination may be preset.

In an example, $\rho_\varepsilon$ obtained when the spectrum acquirer information includes any two of position information, the transmission power information and information about the held spectrum of the spectrum acquirer is greater than or equal to a sum of $\rho_\varepsilon$ obtained when the spectrum acquirer information includes only one of any two of the above information and $\rho_\varepsilon$ obtained when the spectrum acquirer information includes only the other of any two of the above information.

Figure 4:
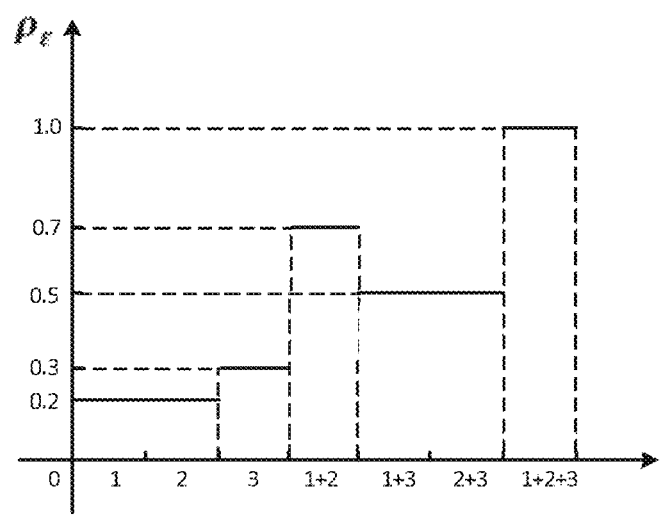
FIG. 4 is a diagram showing a relationship between the number and/or type of information of a spectrum acquirer and a credit value based on the information.

FIG. 4 is a diagram showing a relationship between the number and/or type of the spectrum acquirer information and the credit value $\rho_\varepsilon$ based on information. In FIG. 4, an abscissa 1 indicates position information, an abscissa 2 indicates transmission power information and an abscissa 3 indicates the held total spectrum information. As shown in FIG. 4, the following conditions may be set: $\rho_\varepsilon$ is 0.3 in a case that the spectrum acquirer provides only the held total spectrum information; $\rho_\varepsilon$ is 0.2 in a case that the spectrum acquirer provides only the position information or the transmission information; $\rho_\varepsilon$ is 0.7 in a case that the spectrum acquirer provides both the position information and the transmission power information; $\rho_\varepsilon$ is 0.5 in a case that the spectrum acquirer provides the held total spectrum information and one of the position information and the transmission power information; and $\rho_\varepsilon$ is 1.0 in a case that the spectrum acquirer provides the held total spectrum information, the position information and the transmission power information. It should be noted that, in above settings, the electronic device calculating interference to the electronic device from the spectrum acquirer needs two basic parameters of the position information of the spectrum acquirer and the transmission power information of the spectrum acquirer, and thus the two parameters are associated. Therefore, $\rho_\varepsilon(=0.7)$ obtained when the spectrum acquirer provides both the position information and the transmission power information is greater than a sum of $\rho_\varepsilon(=0.2)$ obtained when only the position information is provided and $\rho_\varepsilon(=0.2)$ obtained when only the transmission power information is provided. A sum of $\rho_\varepsilon$ obtained when the spectrum acquirer provides only the position information and $\rho_\varepsilon$ obtained when the spectrum acquirer provides only the transmission power information is 0.4, while $\rho_\varepsilon$ is 0.7 when both the position information and the transmission power information are provided.

The credit value $\rho$ of the spectrum acquirer may be calculated based on at least one of $\rho_R$, $\rho_{BW}$ and $\rho_\varepsilon$. The credit value $\rho$ may be calculated according to the following equation (7):

$$\rho = w_1 \cdot \rho_R + w_2 \cdot \rho_{BW} + w_3 \cdot \rho\varepsilon \quad (7).$$

In which, $w_1$, $w_2$ and $w_3$ represent weights and may be set according to actual requirements.

The credit value of the transaction party is calculated based on at least one of the transaction party information included in the information of the spectrum transaction, the historical transaction information and the total number of held spectrums of the transaction party, and thus the credit of the transaction party can be obtained accurately.

The credit value $\rho$ of spectrum acquirer is compared with the pre-determined credit threshold $\rho_{th}$. If $\rho \geq \rho_{th}$, the spectrum acquirer is determined to be credible; otherwise, the spectrum acquirer is determined to be incredible. Similarly, in a case that the credit value of the spectrum provider is greater than the pre-determined credit threshold, the spectrum provider is determined to be credible; otherwise, the spectrum provider is determined to be incredible.

In an example, the electronic device 100 is a main body in a decentralized spectrum management system, wherein the decentralized spectrum management system includes a plurality of main bodies, the plurality of main bodies include the spectrum acquirer and a spectrum provider as transaction party of the spectrum transaction, the plurality of main bodies respectively hold database copies that are the same as each other, and wherein the database copy held respectively by the plurality of main bodies is updated based on information of the spectrum transaction verified to be valid.

The present disclosure provides a combination of a block chain and a dynamic spectrum access technology. The spectrum management system based on block chain is an example of the decentralized spectrum management system, a node in the spectrum management system based on block chain is an example of the above main body, and a general ledger stored locally by each node in the chain block is an example of the database copy. Hereinafter, the spectrum transaction is referred to as transaction for short sometimes, and the electronic device, the main body, the transaction party, the spectrum acquirer and the spectrum provider each are referred to as a node for short, for convenience of the description.

Figure 5:
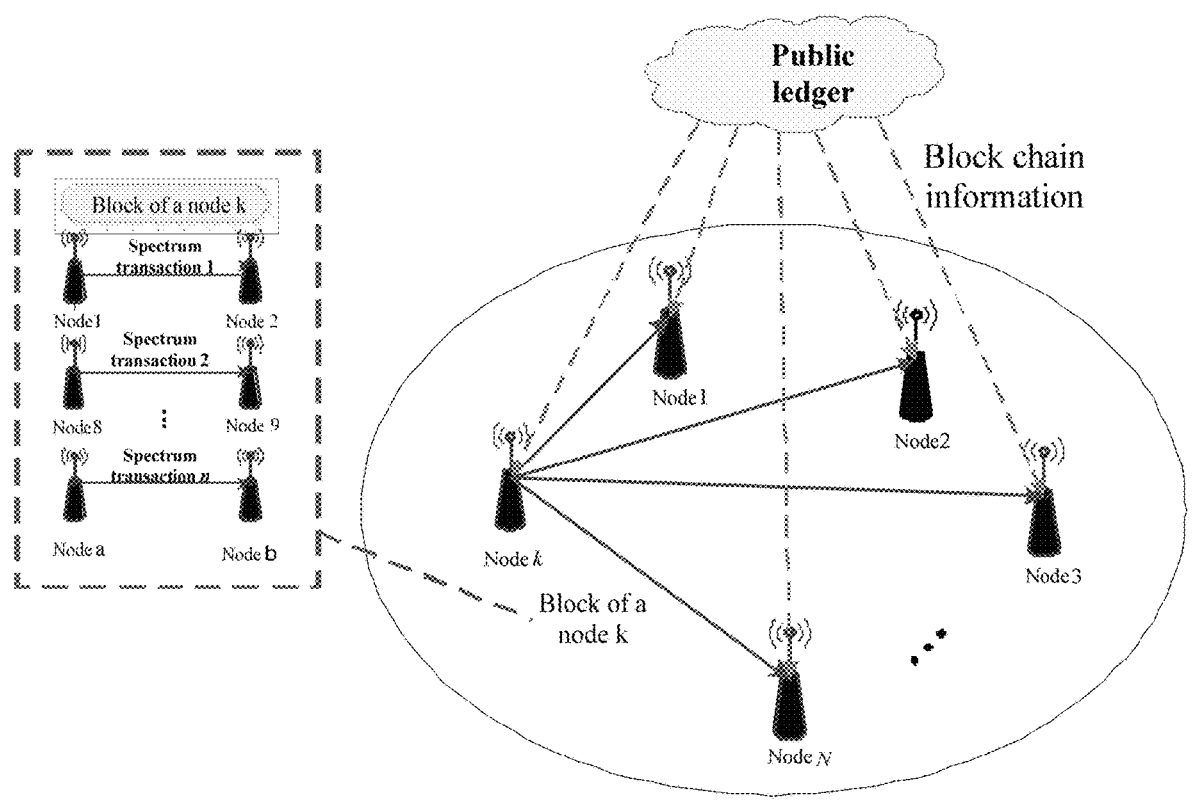
FIG. 5 is a diagram of an example of a spectrum management system based on a block chain according to an embodiment of the present disclosure.

FIG. 5 is a diagram showing an example of a spectrum management system based on block chain according to an embodiment of the present disclosure.

As shown in FIG. 5, the spectrum management system based on block chain according to the embodiment of the present disclosure includes N (N is a positive integer greater than 1) common nodes and a real-time updated (cloud) general ledger. The spectrum management system has no third party center management mechanism. Specifically, the general ledger records all block chain information since a genesis block, and the general ledger is stored in each node locally. With generation of a new block, each node may acquire updated block chain information (for example transaction records, historical credit values of the node) in real time and stores the information in a local database. Therefore, the general ledger stored locally in each node is updated in real time and is same. The distributed data storage mode ensures safety of the user data information.

Figure 6:
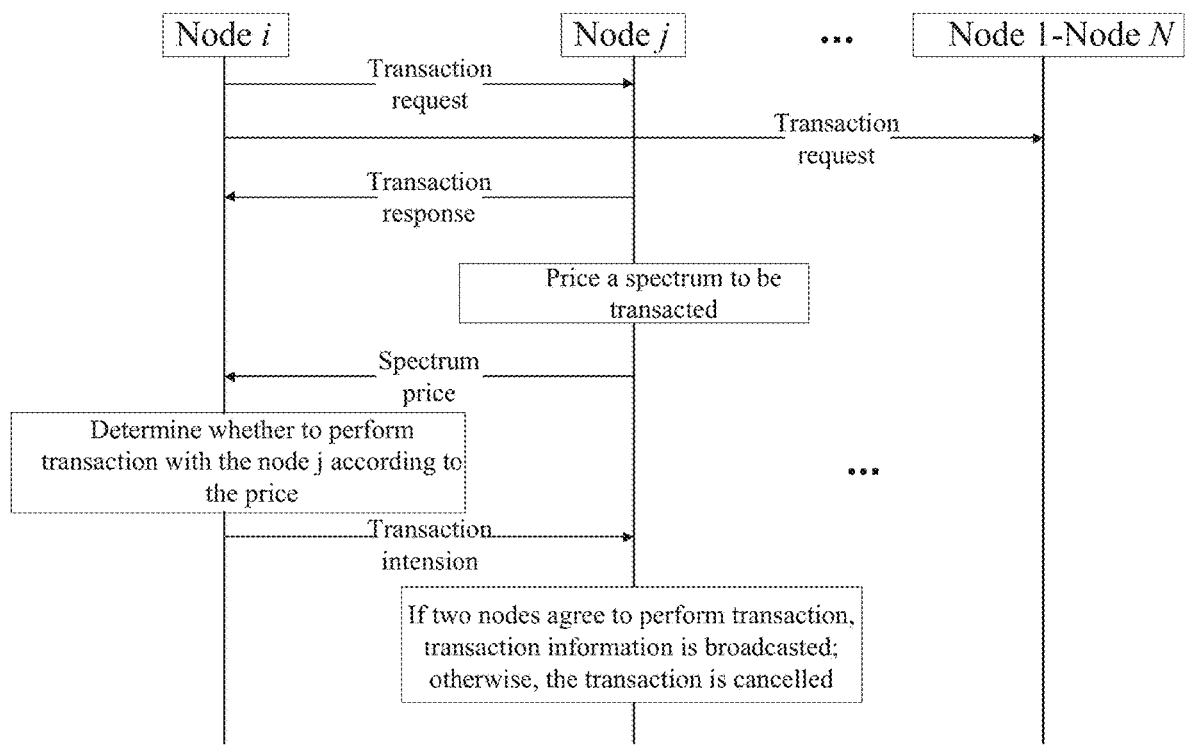
FIG. 6 is a flowchart showing information for determining spectrum transaction intention between nodes according to an embodiment of the present disclosure.

FIG. 6 is a flowchart showing information for determining spectrum transaction intention between nodes according to an embodiment of the present disclosure. As shown in FIG. 6, if a node i (i=1, 2, ..., N) needs spectrums, the node i broadcasts transaction request information to all nodes in a network. If a node j (j=1, 2, ..., N and j is not equal to i) holds a spectrum meeting a condition of the node i, the node j transmits a transaction response to the node i, the node j prices a spectrum to be transacted, and transmits a spectrum price to the node i. The node i determines whether to perform transaction with the node j according to the price information, and transmits the transaction intention to the node j. If the node i and the node j agree to perform spectrum transaction, the information of the spectrum transaction is broadcasted to all nodes in the network; otherwise, the spectrum transaction is cancelled.

All nodes in the spectrum management system based on block chain may construct one block, and each block records all information of spectrum transactions to be performed in a recent time period. FIG. 5 shows an example of blocks constructed by node k (k=1, 2, ..., N). For example, the block shown in FIG. 5 includes information of spectrum transaction 1 performed between a node 1 and a node 2, information of spectrum transaction 2 performed between a node 8 and a node 9, and information of spectrum transaction n (n is a positive integer greater than 2) performed between a node a and a node b (a, b=1, 2, ..., N and a is not equal to b). The information of the spectrum transaction is stored in the block in a form of list.

In an example, in a case that the electronic device 100 competes for a right of recording spectrum transaction among the multiple main bodies and becomes the electronic device with the accounting right, the electronic device 100 adds a size of a verification area calculated based on the information of the spectrum transaction to the information of the spectrum transaction, and transmits the information of the spectrum transaction to other main body.

Hereinafter, the electronic device with the accounting right is referred to as a node with the accounting right, for convenience of the description.

In the spectrum management system based on block chain according to the present disclosure, each node may compete for the accounting right by adopting any one of known proof of work (PoW) mechanism, proof of stake (PoS) mechanism and delegated proof of stake (DPoS) mechanism. Those skilled in the art should understand that each node may compete for the accounting right by adopting other mechanisms, which are not described herein.

A mechanism of competing for the accounting right by nodes is described briefly by taking the PoS mechanism as an example. The essence of the PoS mechanism is in that a node with a highest right in the system obtains an accounting right of a current block. The right embodies as ownership to a certain number of coins, referred to as coin age or coin days. The coin age is a product of the certain number of coins and a time length of a last transaction. Each transaction consumes the certain number of coin age. For example, a certain node receives 10 coins at a transaction and holds the coins for 10 days, the node obtains 100 coin ages. Then, the node spends 5 coins, 50 coin ages are consumed. Apparently, according to the PoS mechanism, the total number of coin ages at a certain time instant is limited, and the node holding the coin for long time tends to hold more coin ages. Therefore, the coin age may be regarded as right of the node. The node with a highest coin age obtains the accounting right of the current block, and the block constructed by the node with the accounting right is to be verified by other coexistence nodes.

The block chains starts from a genesis block, and new blocks are connected to the block chain continuously. In the embodiment of the present disclosure, it is assumed that some blocks are connected to a main chain of the block chain, only after the transaction to be performed stored in the block constructed by the node with the accounting right is verified and passed by the coexistence nodes, the block can be connected to the main chain of the block chain. That is, all transactions to be performed which are stored in the block constructed by the node with the accounting right (for example the node k) are required to be verified by other nodes whether harmful interference is caused to the coexistence node before the transactions are performed. For example, for a certain spectrum transaction, for example transaction between the node 1 and the node 2 shown in FIG. 5, since the spectrum ownership may transfer, for example a certain channel is transacted to the node 2 from the node 1, the transaction may result in harmful interference to other coexistence node which uses a channel having a same frequency as the certain channel. Therefore, the transaction is required to be verified, and other transactions stored in the block of the node k are also required to be verified. That is, the node with the accounting right transmits the generated block to all coexistence nodes for verification, and the block verified to be valid is connected to the main chain of the block chain.

As described above, in a case that the electronic device 100 is the electronic device with the accounting right, the electronic device 100 calculates a size of the verification area. In an example, the electronic device 100 may calculate the size of the verification area according to the equation (1). In a case that the verification area is a circular area of which a center is the spectrum acquirer, the electronic device 100 calculates a radius of the verification area according to the equation (2). Then, the electronic device 100 adds the calculated size of the verification area to the information of the spectrum transaction, and transmits the information of the spectrum transaction to other nodes, so that nodes located in the verification area verify the spectrum transaction. In an example, the spectrum transaction includes multiple spectrum transactions. The electronic device 100 may calculate a size of the verification area corresponding to the spectrum transaction based on information of each of the multiple spectrum transactions, and adds the calculated size of the verification area to the information of the spectrum transaction.

FIG. 7 shows an example of a verification area according to an embodiment of the present disclosure. It is described by taking the block of the node –k(k=1, 2, . . . , N) shown in FIG. 5 as an example. As shown in FIG. 7, a verification area 1 of spectrum transaction –1 performed between the node 1 and the node 2 includes the node 1, the node 2, a node 3, a node 4 and a node 5, and a verification area 2 of spectrum transaction –2 performed between a node 8 and a node 9 includes the node 8, the node 9, a node 10 and a node 11, and a verification area 3 of spectrum transaction –3 performed between a node 6 and a node 7 includes the node 6, the node 7, a node 12 and a node 13. It should be noted that, the verification area is described as an oval area for convenience of drawing. As described above, only the node located in the verification area of the spectrum transaction verifies the validity of the spectrum transaction.

As described above, in a case that the electronic device 100 according to the embodiment of the present disclosure is the electronic device with the accounting right, the electronic device 100 not only has the accounting right, but also can calculate the size of the verification area.

FIG. 8 shows an example of information of the spectrum transaction according to an embodiment of the present disclosure. As shown in FIG. 8, the information of the spectrum transaction includes basic transaction information and optional transaction information for improving a credit value of the node. The basic transaction information may include: the spectrum acquirer, the spectrum provider, spectrum to be transacted, a transaction price, a historical credit value of a transaction party, and a size of a verification area, for example. The optional transaction information includes position information $(x_1, y_1)$ and a transmission power of the spectrum acquirer (referred to as buyer for short), and the total number of spectrums held by the transaction party. In which, $x_1$ and $y_1$ represent geological position coordinates of the spectrum acquirer.

In an example, each node (node 1, node 2, . . . , node N) extracts the information of the spectrum transaction from a block provided by the node with the accounting right. An example of verifying the transaction by the node is described briefly by taking the node i (i=1, 2, . . . , N) as an example. As described above, in a case that the node i determines that the node i is located in the verification area of the spectrum transaction, the node i may verify validity of the spectrum transaction in a case that a credit value of the transaction party of the spectrum transaction is greater than a pre-determined credit threshold.

In a case that the node i knows by calculating that the credit value of the transaction party of the spectrum transaction is greater than the pre-determined credit threshold, as an example, the node i may first verify the following four items of the transaction (the four items referred to as conventional four items sometimes hereinafter): 1, whether a balance of the spectrum acquirer can pay for the spectrum; 2, whether the balance of the spectrum acquirer is applied to perform dual pay; 3, whether information of the transaction to be performed is transmitted from a transaction party; and 4, whether the information of the transaction to be performed is maliciously tampered. If not all the above four items are verified successfully, the transaction is referred to as bad transaction, and the node determines the transaction to be invalid. In an example, in the bad transaction, the node as the transaction party performs dishonesty behaviors such as reporting false transaction information or tampering the transaction information. The verification of the above conventional four items can increase the reliability of the spectrum transaction. Those skilled in the art may conceive other examples of the bad transaction, which are not described herein.

In an example, in a case that the node i determines that the transaction meets the above conventional four items, the node i determines whether the node i is subjected to harmful interference by comparing a signal to interference plus noise threshold set for the node i and the signal to interference plus noise ratio of the node i when the transaction is performed. In an example, the signal to interference plus noise ratio of the node i calculated according to equation (4) is represented as $SINR_i$, and the signal to interference plus noise ratio set for the node i is represented as $SINR_{th}$. If $SINR_i$ is greater than $SINR_{th}$, the node i determines that the transaction is valid; otherwise, the node i determines the transaction is invalid. In an example, the node i signs for the transaction after completing the verification of the transaction.

All nodes in the spectrum management system based on block chain according to the embodiment of the present disclosure may determine whether they are located in the verification area of the spectrum transaction and performs verification in series or in parallel.

Firstly, a case that all nodes determine whether to locate in the verification area of the spectrum transaction and perform transaction in serial is described hereinafter.

In an example, multiple main bodies (nodes) in the spectrum management system based on block chain determine whether they are located in the verification area of the spectrum transaction sequentially; and verify the spectrum transaction if it is determined that the main bodies are located in the verification area, and transmit determination and verification results to a main body that does not perform the determination among the multiple main bodies.

In an example, determination is started from a determination starting main body. In an example, the determination starting main body may be any node in the block chain. In a case that the determination starting main body determines that it is located in the verification area of the spectrum transaction, the spectrum transaction is verified as described above and the spectrum transaction is signed after the verification is completed. In a case that the determination starting main body determines that it is not located in the verification area, the spectrum transaction is not verified, and the spectrum transaction is not signed. In a case that the determination starting main body performs the determination on all the transactions in the block, the determination starting main body transmits the signed block to other nodes which do not perform the determination. Other nodes perform the same processing as the determination starting main body. When all the nodes in the spectrum management system perform the determination, the determination process ends. In an example, the determination process ends when a determination ending main body which is a last one for performing the determination of all nodes in the spectrum management system. Hereinafter, the determination starting main body is referred to as a determination starting node and the determination ending main body is referred to as a determination ending node sometimes, for convenience of the description.

In a case that the determination is performed in serial, it is required to determine the determination order for the nodes (main bodies) to perform above determination.

In an example, the determination order may be determined based on a node numbering sequence determined when the spectrum management system is established, a node numbering sequence updated when a new node is added, or a node numbering sequence updated regularly. The spectrum management based on block chain differs from the conventional block chain system. For example, nodes in the conventional block chain system access to the network from time to time, and the number and a state (such as, turned on or off) of the node change significantly. The number and the state of nodes in the spectrum management system based on block chain change a little, therefore, each node is numbered, the node numbering sequence may be determined when the spectrum management system is established, or the node numbering sequence is updated when a new node is added, or the node numbering sequence is updated regularly. In an example, multiple nodes in the spectrum management system may perform the determination in the numbering sequence. For example, a node ranking first in the numbering sequence among the multiple nodes may function as the determination starting node, each node transmits the determination and verification result to a node with a next number, and a node ranking last in the numbering sequence among the multiple nodes may function as the determination ending node.

In an example, the determination order may be determined based on spatial positions of nodes in the spectrum management system. For example, a node completing determination may transmit the determination and verification result to a node closest to the node completing determination to perform the determination. Those skilled in the art may conceive other methods for determining the determination order, which are not described herein.

In an example, the determination ending main body calculates a final verification result based on verification results of all main bodies in the verification area, and transmits the final verification result to other main bodies.

In an example, the determination ending node comprehensively analyzes results of all the nodes to obtain a verification passing rate of the transaction.

For any spectrum transaction, if the total number of nodes located in the verification area of the transaction is $N_T$ and the number of nodes which verify the transaction to be valid is $N_v$, the verification passing rate of the transaction may be calculated as follows:

$$\gamma = N_v/N_T \quad (8)$$

In an example, the determination ending node compares the verification passing rate with a pre-determined passing rate threshold γth. If γ≥γth, it is determined that the transaction is valid; otherwise, the transaction is invalid. γth may be determined in advance according to actual need. In the embodiment of the present disclosure, by means of the verification passing rate, it can be ensured that the verification result for the spectrum transaction can conform to verification results of a majority of nodes.

The determination ending node may use the verification passing rate as the final verification result. Those skilled in the art may conceive other examples of the final verification result, which are not described herein.

The determination ending node transmits a verified block including the final verification result to other nodes. In an example, the determination ending node may transmit the verified block including the final verification result to other node in an order opposite to the order in which the nodes perform the determination. In an example, in a case that multiple nodes in the spectrum management system perform the determination from front to back in the node numbering sequence, the determination ending node may transmit the verified block to other nodes from back to front in the node numbering sequence.

In order to prevent the determination ending node from providing a false final verification result, each of other nodes calculates a final verification result of each transaction included in the verified block after receiving the verified block. For the transaction included in the verified block, if it is determined that the final verification result calculated by the determination ending node is different from the final verification result calculated by other node, the transaction is required to be re-verified. The bad transaction recording described above may include a case that a node which is the determination ending node provides a false final verification result.

In a case that each of the multiple main bodies agrees with the final verification result, each main body stores the information of the spectrum transaction in a database copy held by the main body. That is, if the final verification result calculated by the determination ending node is the same as the final verification result calculated by other nodes, the transaction is finally verified to be valid. In this case, all coexistence nodes in the spectrum management system store the verified block locally, and the verified block is connected to the block chain.

It is illustrated by taking the final verification result as the verification passing rate as an example. After receiving the verified block, each of other nodes calculates a verification passing rate of each transaction included in the verified block. If the verification passing rate calculated by the determination ending node is not consistent with the verification passing rate calculated by the other nodes, the transaction is required to be re-verified. For example, for a transaction, if the verification passing rate of the transaction calculated by the determination ending node is 0.9, and the verification passing rate calculated by any other node x (x=1, 2, . . . , N and the node x is not the determination ending node) is not 0.9, it is indicated that the node x doubts the verification result of the transaction and thus the transaction is required to be re-verified. If the verification passing rate calculated by the determination ending node is consistent with the verification passing rate calculated by other node (that is, the node x agrees with the verification result of the transaction), the transaction is finally verified to be valid.

In the serial manner according to the embodiment of the present disclosure, in a case that the determination ending node is not the node with the accounting right, the final verification result of the transaction is calculated by the determination ending node rather than the node with the accounting right, thereby preventing information excessive centralization for the node with the accounting right and reducing the calculation load of the node with the accounting right.

Figure 9:
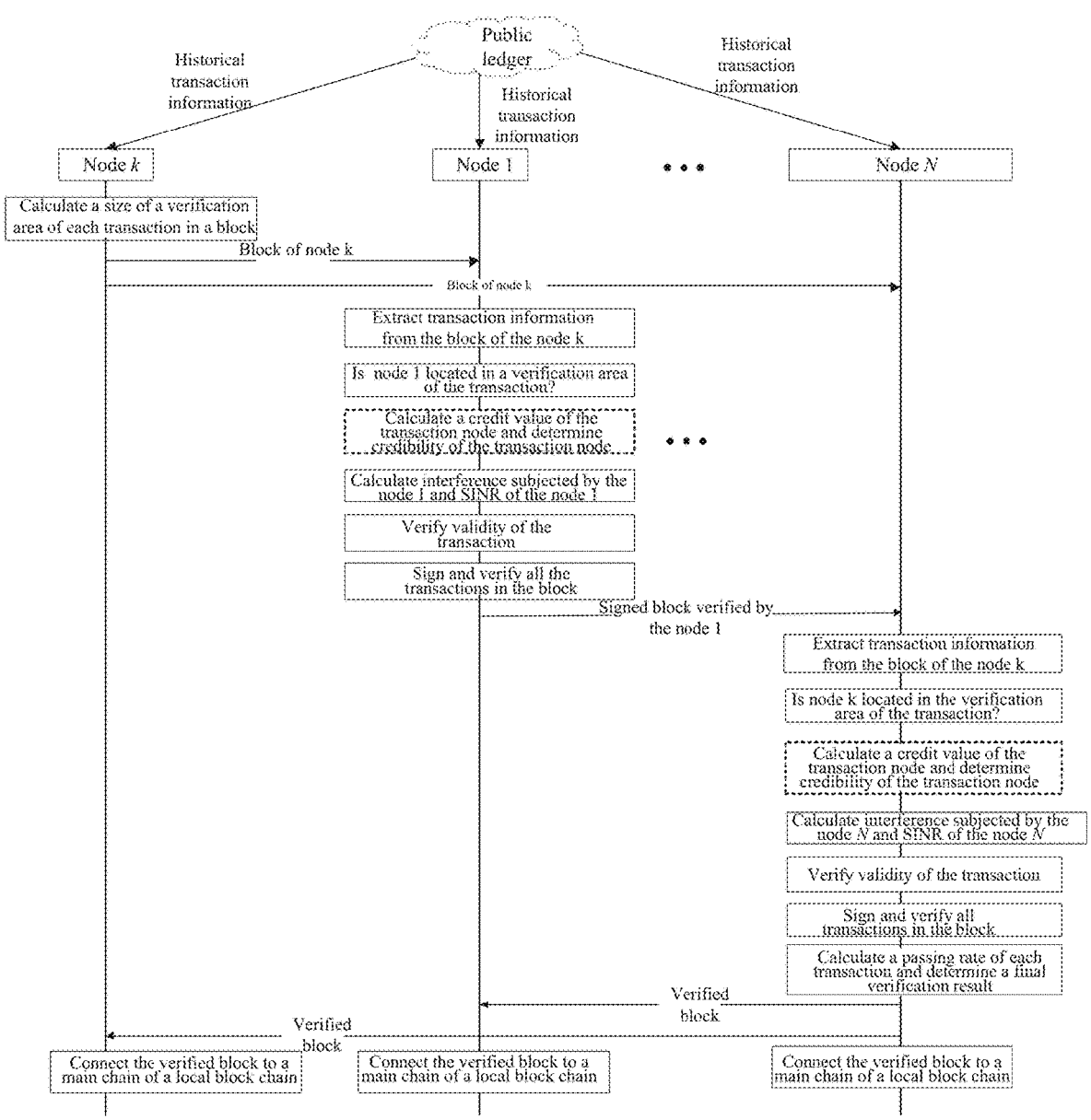
FIG. 9 shows an information flow that each node in the spectrum management system based on block chain determines whether the node is located in a verification area of the spectrum transaction and performs verification in serial according to an embodiment of the present disclosure.

FIG. 9 shows an information flow that each node in the spectrum management system based on block chain determines whether the node is located in a verification area of the spectrum transaction and performs verification in serial according to an embodiment of the present disclosure.

In FIG. 9, the spectrum management system includes N nodes in total, that is, node 1, node 2, . . . , node N. Each node may acquire historical transaction information of a spectrum node as a transaction party from the public ledger stored locally. It is assumed that the node k is the node with the accounting right from the node 1 to the node N.

The node k calculates a size of the verification area of the transaction based on information provided by each spectrum transaction to be verified stored in its block, and attaches information of the size of the verification area to the information of the spectrum transaction. The node k transmits the block including the information of the spectrum transaction to other node. Each node in the spectrum management system extracts the information of the spectrum transaction from the block transmitted by the node k, and determines whether the node is located in the verification area of the transaction based on position information of the transaction party (also referred to as the transaction node) and the information of the size of the verification area. The node k verifies the transaction only in a case that the node k is located in the verification area of the spectrum transaction.

For convenience of the description, in FIG. 9, it is assumed that the node 1 is the determination starting main body, the node N is the determination ending main body, and the spectrum transaction to be verified is spectrum transaction $T_{i-j}$ between the node i and the node j. Starting from the determination starting main body node 1, it is determined whether the node 1 is located in the verification area of the spectrum transaction $T_{i-j}$ and verification is performed.

Not explicitly shown in FIG. 9, in a case that the node 1 determines that it is not located in the verification area of the spectrum transaction $T_{i-j}$, the spectrum transaction $T_{i-j}$ is not verified and the spectrum transaction is not signed, and a next transaction is determined. In a case that the node 1 determines that it is located in the verification area of the spectrum transaction $T_{i-j}$, the node 1 may calculate a credit value of a transaction node in the spectrum transaction $T_{i-j}$ and determine credibility of the transaction node, so as to increase reliability of the spectrum transaction. For example, the node 1 acquires the historical transaction information of the transaction node from the public ledger stored locally, determines whether the transaction node has bad transaction recording, and calculates the credit value based on historical transaction information of the transaction node according to equation (5). The node 1 may calculate a credit value based on a spectrum total number of the transaction node according to equation (6), based on the total number of spectrums held by the transaction node in the information of the spectrum transaction. The node 1 calculates the credit value based on information of the transaction node according to the total information amount and type of the transaction node in the information of the spectrum transaction. In an example, the node 1 may calculate the credit value of the transaction node according to equation (7), based on at least one of the credit value based on historical transaction information, the credit value based on the total number of spectrum and the credit value based on information of the transaction node. The node 1 compares the credit value of the transaction node with a pre-determined credit threshold, and determines transaction of a node of which the credit value is less than the pre-determined credit threshold to be invalid. The following verification is performed on the transaction of a node of which the credit value is greater than the pre-determined credit threshold.

Not shown in FIG. 9, the node 1 may verify whether the spectrum transaction meets the above conventional four items. If the spectrum transaction $T_{i-j}$ meets the conventional four items, the verification is performed continuously; otherwise, the spectrum transaction $T_{i-j}$ is determined to be invalid. Then, the node 1 calculates, when the spectrum acquirer uses the spectrum transacted in the spectrum transaction $T_{i-j}$, interference subjected by the node 1 (calculating according to equation (3)), and a signal to interference plus noise ratio SINR of the node 1 (calculating according to equation (4)). Then, the SINR of the node 1 is compared with the signal to interference plus noise ratio threshold set for the node 1. If the SINR of the node 1 is greater than the signal to interference plus noise ratio threshold set for the node 1, the node 1 verifies the transaction to be valid; otherwise, the node 1 verifies the transaction to be invalid.

Not explicitly shown in FIG. 9, the node 1 signs the transaction after completing verification of the spectrum transaction $T_{i-j}$, then performs similar determination and verification on a next transaction. In addition, after the node 1 performs determination and verification on all transactions in the block, the node 1 signs the block and transmits the verified and signed block to a next node.

Other node in the spectrum management system performs similar determination and verification as the node 1.

In addition to performing similar determination and verification as the node 1, the node N as the determination ending main body determines a final verification result for each transaction in the block. In an example, the node N may calculate the verification passing rate of each transaction according to equation (8) as the final verification result of respective transaction. Then, the node N transmits the verified block including the final verification result to other nodes in the spectrum management system.

In an example, if all other nodes each agree with the final verification result, all nodes in the spectrum management system connect the verified block to a main chain of a local block chain. If other node doubts the final verification result, a doubted spectrum transaction is required to be re-verified.

A case that all nodes determine whether to locate in the verification area of the spectrum transaction and perform verification in parallel is described hereinafter.

In an example, in a case that multiple main bodies (nodes) in the spectrum management system based on block chain determine that the main bodies are located in the verification area based on the size of the verification area, the main bodies verify the spectrum transaction respectively and transmit verification results to the electronic device 100 with the accounting right. The electronic device 100 may be configured to calculate a final verification result based on a verification result received from each main body in the verification area, and transmit the final verification result to other main bodies.

In an example, in the parallel manner, each node in the spectrum management system performs in parallel verification process on the spectrum transaction in the block received from the node with the accounting right. The verification process performed by node m (m=1, 2, . . . , N) in the parallel manner is described briefly hereinafter. In a case that the node m determines that the node m is located in the verification area of the spectrum transaction the node m may calculate a credit value of a transaction node in the spectrum transaction and determines credibility of the transaction node. Then, the node m verifies whether the spectrum transaction meets above conventional four items. If the spectrum transaction meets above conventional four items, the verification is performed continuously; otherwise, the spectrum transaction is determined to be invalid. Then, the node m calculates a signal to interference plus noise ratio of the node m when the spectrum acquirer uses the spectrum transacted in the spectrum transaction $T_{i-j}$. In a case that the calculated signal to interference plus noise ratio is greater than a signal to interference plus noise ratio threshold set for the node m, the node m verifies the transaction to be valid; otherwise, the node m verifies the transaction to be invalid. The node m signs the transaction after completing the verification of the spectrum transaction and then performs determination and verification on a next transaction. In addition, after the node m performs determination and verification on all the transactions in the block, the node m signs the block and transmits the verified and signed block to the node with the accounting right.

The node with the accounting right calculates a final verification result based on verification results of all nodes located in the verification area, and transmits the final verification result to other nodes. In an example, the node with the accounting right may use the verification passing rate of the transaction calculated according to equation (8) as the final verification result.

Then, the node with the accounting right transmits the verified block including the final verification result to other nodes. In order to prevent the node with accounting right from providing a false final verification result, each of other nodes calculates a final verification result of each transaction included in the verified block after receiving the verified block. For the transaction included in the verified block, if the final verification result calculated by the node with the accounting right is different from the final verification result calculated by other node, the transaction is required to be re-verified. The bad transaction recording described above may include a case that a node provides a false final verification result when the node is the node with the accounting right.

In a case that each main body (node) of multiple main bodies (nodes) agrees with the final verification result, each main body (node) stores the information of the spectrum transaction in a database copy held respectively by the main body (node). That is, if the final verification result calculated by the node with the accounting right is the same as the final verification result calculated by other nodes, the transaction is finally verified to be valid. In this case, all coexistence nodes in the spectrum management system store the verified block locally, and the verified block is connected to the block chain.

In the parallel manner according to the embodiment of the present disclosure, the main bodies located in the verification area verify the spectrum transaction in parallel and the node with the accounting right calculates the final verification result of the transaction, thereby improving the efficiency of the verification.

In the embodiment of the present disclosure, the serial manner and the parallel manner may be switched based on different transaction types. Different nodes may have different service types, and thus the services have different requirements for transaction delay. For example, the requirement for delay of a remote meter reading service is low, and the requirement for delay of a vehicle network service is high. In the embodiment of the present disclosure, the serial manner or the parallel manner may be switched according to different service types, to ensure transaction performing. For example, the vehicle network service with high delay requirement may adopt the parallel manner to ensure the transaction performing, and the remote meter reading service with the low delay may adopt the serial manner to ensure the transaction performing, thereby supporting spectrum transaction in multi-service scene and improving the system performance and the verification efficiency of the spectrum transaction.

It is assumed that the total number of nodes in the spectrum management system is $N_{node}$, and the number of nodes as the spectrum acquirer participating in transaction is $N_{buyer}$.

In the conventional spectrum management system, verification is not performed based on the verification area of the transaction. Each node in the system needs to verify each transaction, and thus the total number of verification is represented as follows:

$$N_{tr} = N_{node} * N_{buyer} \qquad (9).$$

In the spectrum management system according to the embodiment of the present disclosure, if the number of nodes verifying each transaction is $N_{per-tr}$, the total number $N_{tr}*$ of the verification is represented as follows:

$$N_{tr}* = N_{per-tr} * N_{buyer} \qquad (10).$$

In the spectrum management system according to the embodiment of the present disclosure, since the verification area of the transaction is adopted, $N_{per-tr}$ is far less than $N_{node}$, and thus $N_{tr}*$ is far less than $N_{tr}$. That is, in the spectrum management system according to the embodiment of the present disclosure, since the verification area of the transaction is adopted, the total number of verification is significantly reduced, thereby greatly reducing the total overhead of the system.

In an example, the total overhead of the system may be affected by the pre-determined interference threshold set for the spectrum transaction, and a proportion of active nodes in the spectrum management system and so on. The total overhead of the system is increased with increasing of the proportion of the active node, and is increased with decreasing of the pre-determined interference threshold set for the spectrum transaction.

In an example, the spectrum management system is ultra-dense networks (UDN). With increasing of wireless access nodes, distribution efficiency of the centralized spectrum management manner reduces significantly. In a case that the spectrum management system based on block chain according to the embodiment of the present disclosure is the ultra-dense network, the problem of low distribution efficiency of the conventional ultra-dense network can be solved by adopting the decentralized distribution manner, thereby improving the distribution efficiency.

An application scene of the spectrum management system according to the embodiment of the present disclosure is described briefly hereinafter. It is assumed that there is a city scene, and nodes are distributed randomly in the scene. Spectrum transaction may be performed between any two nodes, a transaction record is stored in a block of each node, and each node collects all transaction records generated since forming of the last block and stores the transaction records in the block. Each node competes for the accounting right, each transaction in a block established by the node obtaining the accounting right is required to be verified, and only the block being successfully verified can be connected to a main chain of the block chain. Each transaction relates to two nodes, that is, a spectrum acquirer (that is, a buyer) and a spectrum provider (that is, a seller). The seller sells the spectrum to the buyer, and the buyer obtains the spectrum via the transaction, and the transaction information is stored in the block. The node with the accounting right transmits its established block to all coexistence nodes for verification. For a transaction, the node performs the following processing. The node determines whether the node is located in the verification area of the transaction. If the node is not located in the verification area of the verification, it is unnecessary to perform verification. In a case that the node determines that it is located in the verification area of the transaction, a credit value of the transaction party is calculated, to determine credibility of the transaction party. Transaction of an incredible node is directly determined to be invalid. In a case that the transaction party is determined to be credible, the node verifies the transaction to be valid if the signal to interference plus noise ratio of the node when the spectrum acquirer uses the transacted spectrum is greater than the pre-determined signal to interference plus noise ratio threshold set for the node; otherwise, the node determines the transaction to be invalid. For each verified transaction, the node performs digital signature. The determination ending node (in a serial scene) or the node with the accounting right (in a parallel scene) calculates the verification passing rate of each transaction, to determine the final validity of the transaction, thereby ensuring that the final verification result can conform to the verification results of a majority of nodes. The block being verified successfully is finally connected to the main chain of the block chain.

FIG. 10 is a diagram showing a simulation scene of a spectrum management system according to an embodiment of the present disclosure. FIG. 11 shows parameter setting of a simulation scene of the spectrum management system according to an embodiment of the present disclosure.

Triangles and circles in FIG. 10 represent nodes in the spectrum management system, and the nodes are base stations and are distributed randomly. A circular node represents a node which is performing transaction currently, and a triangular node represents a node which is not performing transaction currently. It is assumed there are 400 nodes in total in FIG. 10, the nodes which is performing transaction currently (that is, active nodes) account for 40% of all the nodes. That is, 160 nodes (80 pairs of nodes) are performing transaction currently in this scene.

Figure 12:
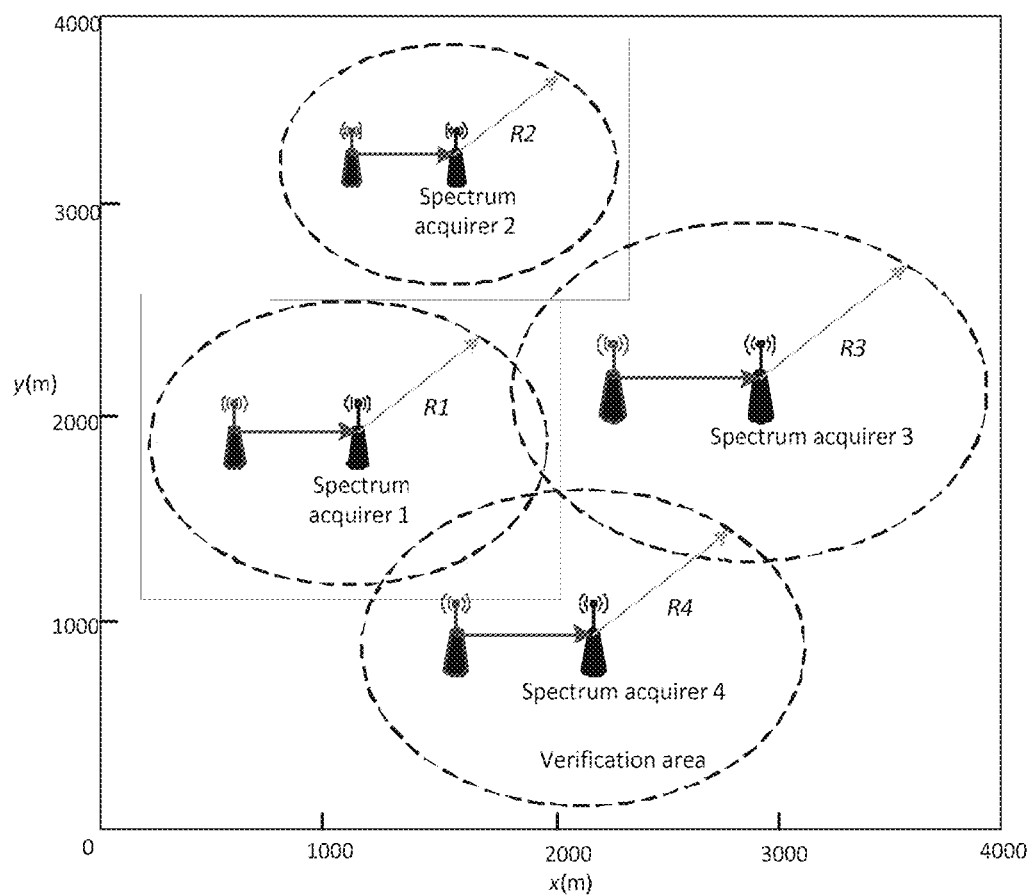
FIG. 12 is a schematic diagram showing simulation of verification areas of various spectrum transactions.

It is assumed that the verification area is a circular area of which a center is a spectrum acquirer of each spectrum transaction. A radius of the verification area of each spectrum transaction is calculated according to equation (2) based on a transmission power and a transmission gain of each node, a path loss coefficient and a pre-determined interference threshold set for each spectrum transaction. FIG. 12 is a schematic diagram showing simulation of a verification area of each spectrum transaction. In which, x and y represent geographic position coordinates. In FIG. 12, a spectrum acquirer (a node which is to buy the spectrum) of each transaction functions as a center of each verification area, and a radius of the verification area is calculated according to equation (2). As shown in FIG. 12, a verification area of spectrum transaction of a spectrum acquirer 1 is a dotted line area of which a center is the spectrum acquirer 1 and of which a radius is R1. A verification area of spectrum transaction of a spectrum acquirer 2 is a dotted line area of which a center is the spectrum acquirer 2 and of which a radius is R2. A verification area of spectrum transaction of a spectrum acquirer 3 is a dotted line area of which a center is the spectrum acquirer 3 and of which a radius is R3. A verification area of spectrum transaction of a spectrum acquirer 4 is a dotted line area of which a center is the spectrum acquirer 4 and of which a radius is R4. It should be noted that, the above circular verification areas are drawn as oval areas for convenience of drawing.

Figure 13:
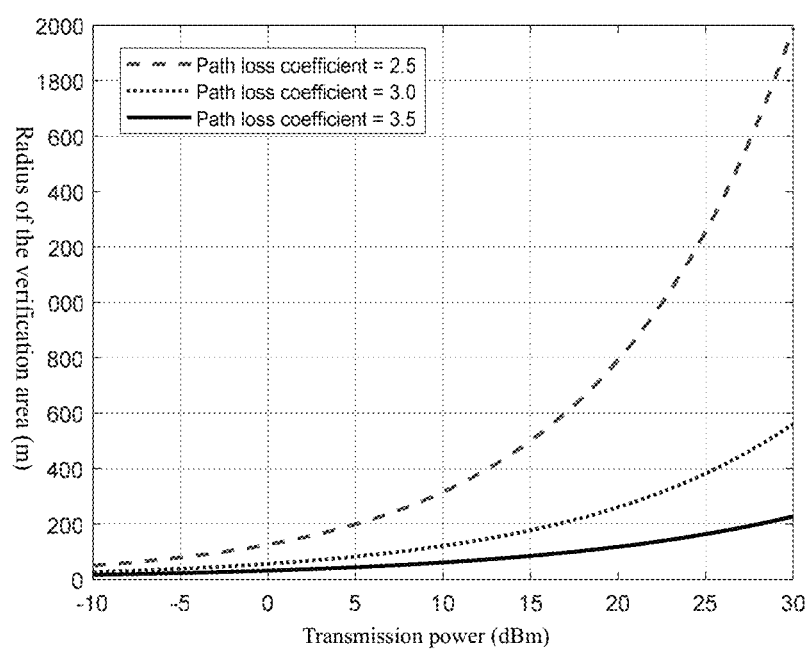
FIG. 13 is a schematic diagram showing simulation of a relationship between a radius of a verification area of spectrum transaction, a transmission power of a spectrum acquirer and a path loss coefficient.

FIG. 13 is a diagram showing simulation of a relationship between a radius of a verification area of spectrum transaction, a transmission power of a spectrum acquirer and a path loss coefficient. As shown in FIG. 13, the radius of the verification area is increased with increasing of the transmission power of the spectrum acquirer, and the radius of the verification area is decreased with increasing of the path loss coefficient.

Figure 14:
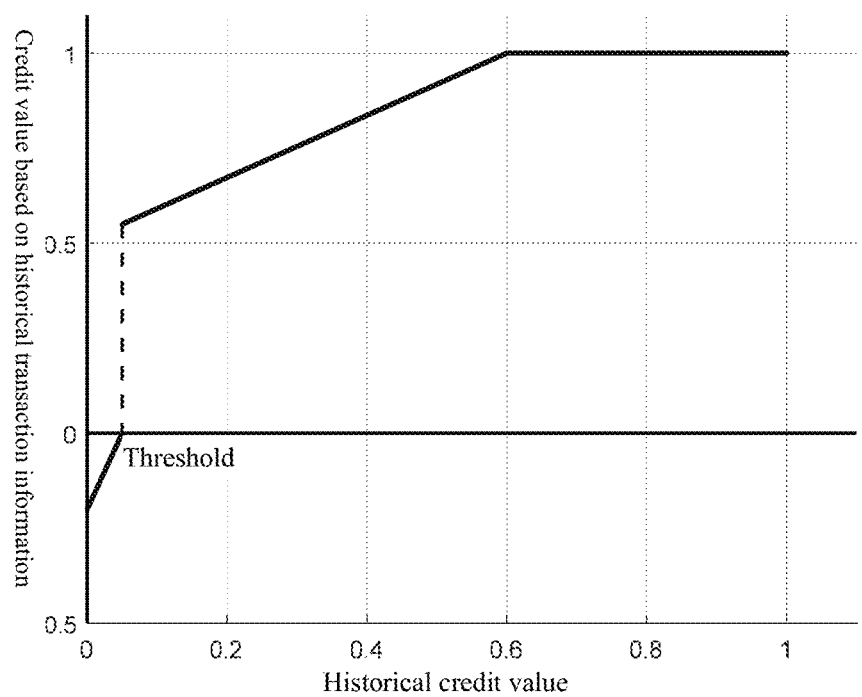
FIG. 14 is a schematic diagram showing simulation of a relationship between a credit value based on historical transaction information of a node and a historical credit value of the node.

FIG. 14 is a schematic diagram showing simulation of a relationship between a credit value based on historical transaction information of a node and a historical credit value of the node. As shown in FIG. 14, in a case that the historical credit value is less than a threshold for indicating existence of a bad transaction recording, the credit value based on historical transaction information is negative; and in a case that the historical credit value is greater than or equal to the threshold, the credit value based on historical transaction information is positive. The credit value based on historical transaction information is increased with increasing of the historical credit value, until reaching a maximum value 1.0.

Figure 15:
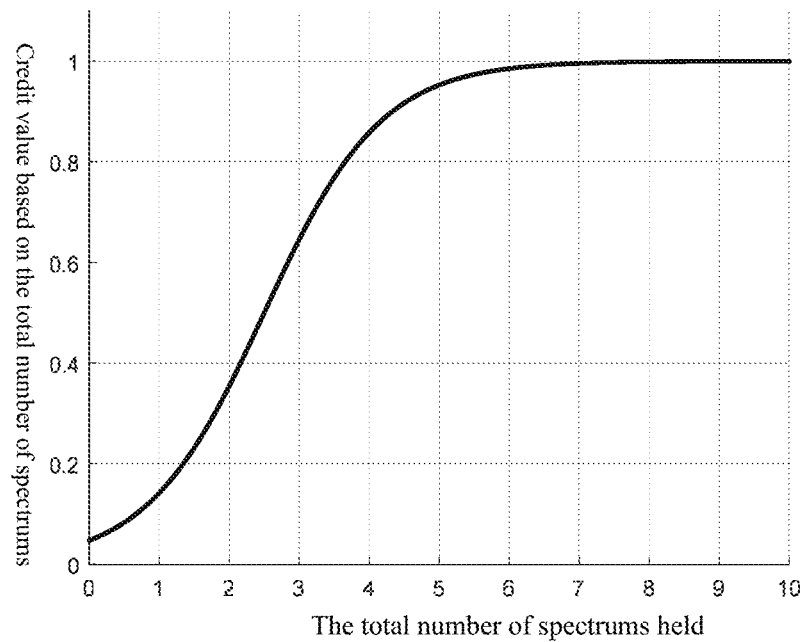
FIG. 15 is a schematic diagram showing simulation of a relationship between a credit value based on the total number of spectrums of a node and the total number of spectrums held by the node.

FIG. 15 is a schematic diagram showing simulation of a relationship between a credit value based on the total number of spectrums of a node and the total number of spectrum held by the node. As shown in FIG. 15, the credit value based on the total number of spectrums of the node is increased with increasing of the total number of spectrums held by the node.

Figure 16:
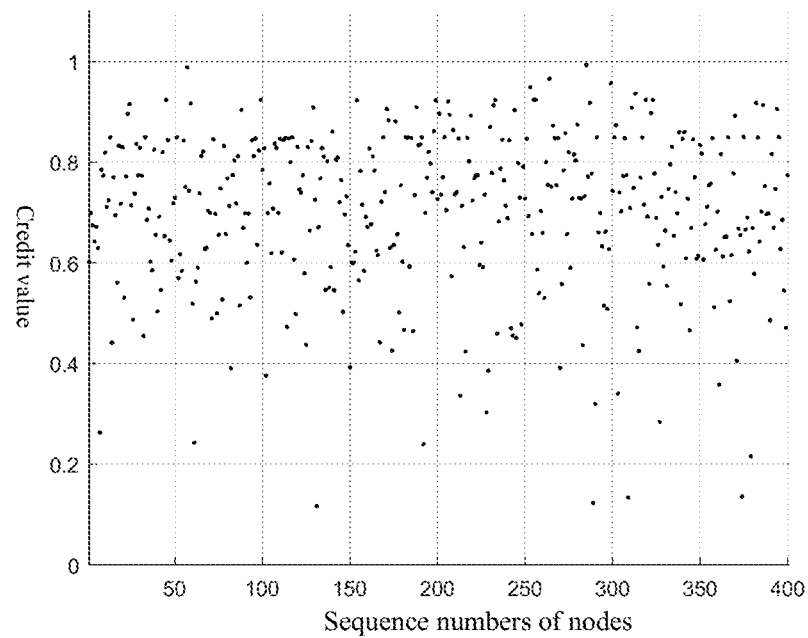
FIG. 16 is a schematic diagram showing a credit value of a node in a spectrum management system.

FIG. 16 is a schematic diagram showing a credit value of a node in a spectrum management system. The credit value of the node in FIG. 16 is calculated according to equation (7) in a case that $w_1=0.5$, $w_2=0.5$ and $w_3=0$.

Figure 17:
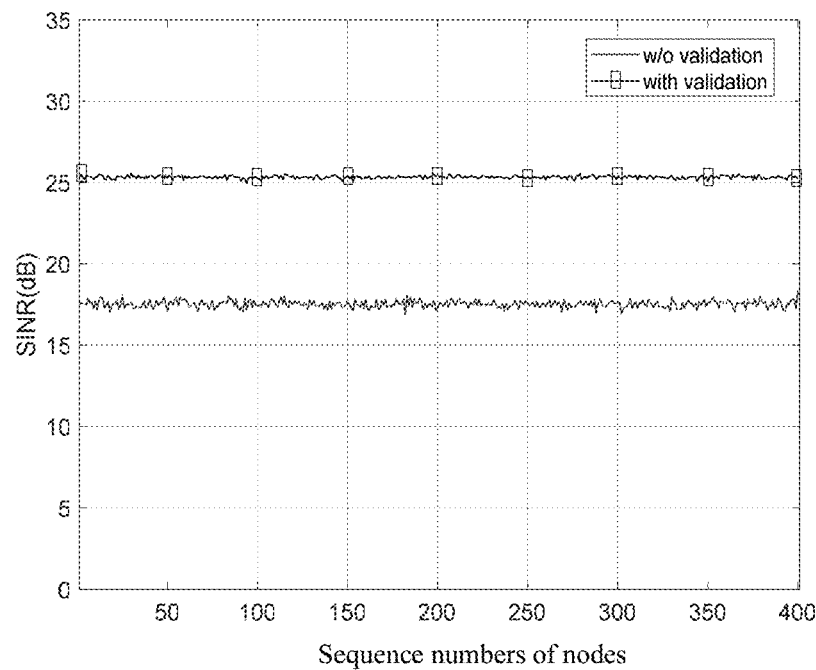
FIG. 17 shows an example of a signal to interference plus noise ratio of each node in a case that a verification mechanism according to the embodiment of the present disclosure is applied, and a signal to interference plus noise ratio of each node in a case that a verification mechanism according to the embodiment of the present disclosure is not applied.

FIG. 17 shows an example of a signal to interference plus noise ratio SINR of each node in a case that a verification mechanism according to the embodiment of the present disclosure is applied (with validation for short) and in a case that the verification mechanism according to the embodiment of the present disclosure is not applied (w/o validation for short). In FIG. 17, an additive Gaussian white noise (AWGN) channel is adopted, the number of nodes is 400, a proportion of active nodes is 40%, and the signal to interference plus noise ratio SINR of each node is an average of the signal to interference plus noise ratios SINR of the node obtained during multiple simulations. As shown in FIG. 17, in a case that the verification mechanism according to the embodiment of the present disclosure is applied, the SINR is increased by about 8 dB in comparison with a case that the verification mechanism according to the embodiment of the present disclosure is not applied.

Figure 18:
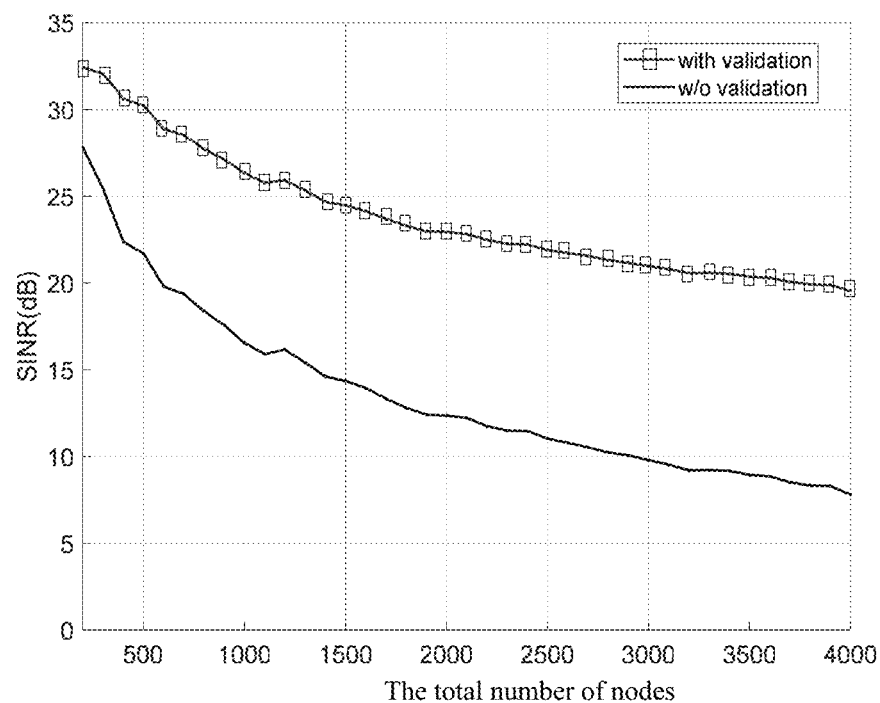
FIG. 18 shows an example of a relationship between a signal to interference plus noise ratio SINR of a node and the total number of nodes, in a case that the verification mechanism according to the embodiment of the present disclosure is applied and in a case that the verification mechanism according to the embodiment of the present disclosure is not applied.

FIG. 18 shows an example of a relationship between the signal to interference plus noise ratio SINR of a node and the total number of nodes in a case that the verification mechanism according to the embodiment of the present disclosure is applied (with validation for short) and in a case that the verification mechanism according to the embodiment of the present disclosure is not applied (verification/o validation for short). In FIG. 18, the AWGN channel is adopted, the total number of nodes is set as 200-4000, and the signal to interference plus noise ratio of the node in FIG. 18 is an average of the signal to interference plus noise ratios SINR of all the nodes in the spectrum management system. As shown in FIG. 18, when the verification mechanism according to the embodiment of the present disclosure is applied, the SINR performance of the node can be improved. The SINR performance of the node is degrades with increasing of the total number of nodes in the scene (that is, increasing of node density) when the verification mechanism is not applied. The improvement of the SINR performance of the node is increased when the verification mechanism according to the embodiment of the present disclosure is applied, with increasing the node density in the scene.

Figure 19:
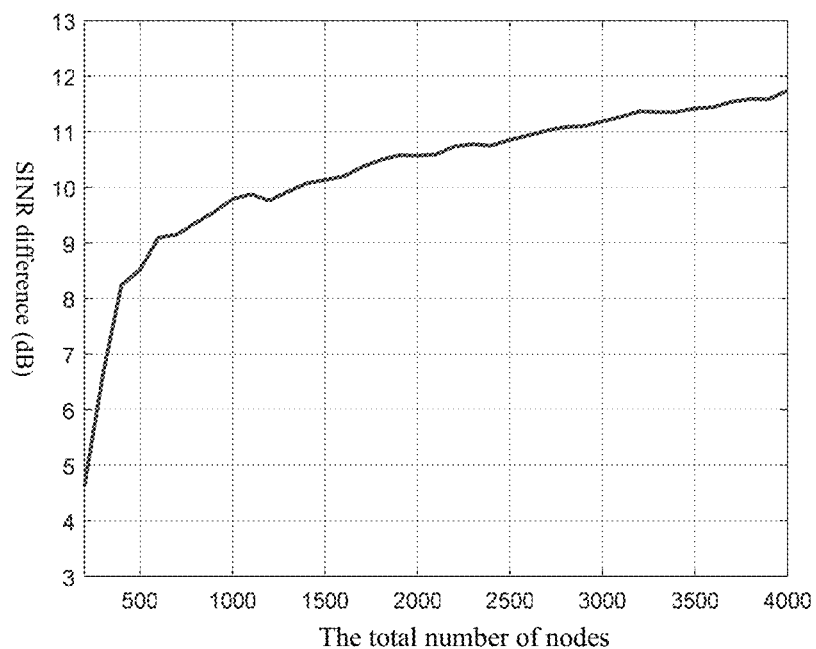
FIG. 19 shows a relationship between the total number of nodes, and a difference between a signal to interference plus noise ratio of a node in a case of applying the verification mechanism according to the embodiment of the present disclosure and a signal to interference plus noise ratio of the node in a case of not applying the verification mechanism according to the present disclosure.

FIG. 19 shows a relationship between the total number of nodes, and a difference (SINR difference) between a signal to interference plus noise ratio of a node in a case of applying the verification mechanism according to the embodiment of the present disclosure and a signal to interference plus noise ratio of the node in a case of not applying the verification mechanism according to the present disclosure. In FIG. 19, the total number of nodes is set as 200-4000. The SINR difference is a difference of an average of signal to interference plus noise ratios SINR of all nodes when the verification mechanism according to the embodiment of the present disclosure is applied, and an average of signal to interference plus noise ratios SINR of all nodes when the verification mechanism according to the embodiment of the present disclosure is not applied. As shown in FIG. 19, the SINR difference is increased with increasing of the total number of nodes. It is indicated that the verification mechanism according to the embodiment of the present disclosure can ensure better performance for the node in a dense network. Therefore, the verification mechanism according to the embodiment of the present disclosure is particularly suitable to the ultra-dense network.

Figure 20:
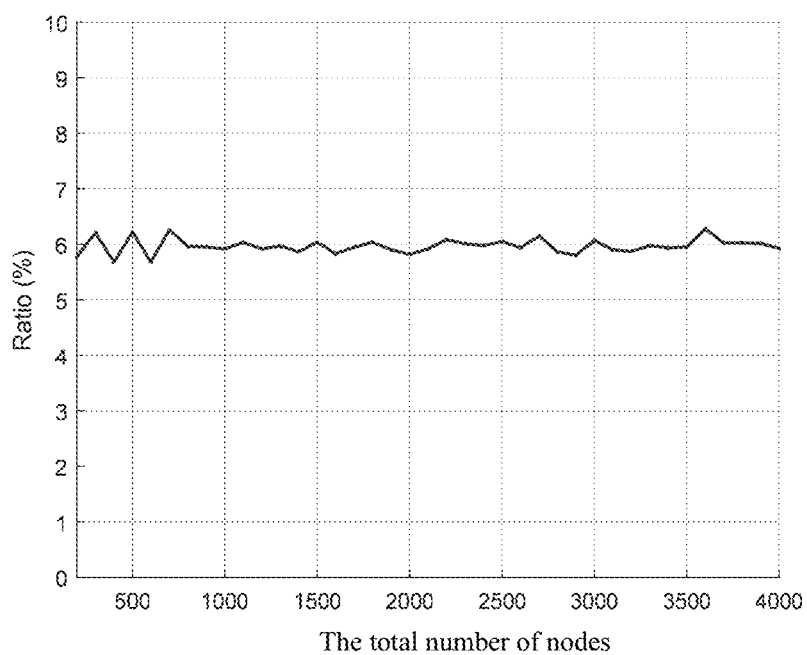
FIG. 20 shows a relationship between the total number of nodes, and a ratio between the total number of verifications in a case of applying the verification mechanism according to the embodiment of the present disclosure and the total number of verifications in a case of not applying the verification mechanism according to the embodiment of the present disclosure.

FIG. 20 shows a relationship between the total number of nodes, and a ratio between the total number of verifications in a case of applying the verification mechanism according to the embodiment of the present disclosure and the total number of verifications in a case of not applying the verification mechanism according to the embodiment of the present disclosure. In FIG. 20, the total number of nodes is set as 200-4000, and the total number of verifications performed when the verification mechanism according to the embodiment of the present disclosure is applied may be calculated according to equation (10), and the total number of verifications performed when the verification mechanism according to the embodiment of the present disclosure is not applied may be calculated according to equation (9). As shown in FIG. 20, since the verification area of the transaction is adopted in the verification mechanism of the embodiment of the present disclosure, the ratio Ratio between the total number of verifications performed when the verification mechanism according to the embodiment of the present disclosure is applied and the total number of verifications performed when the verification mechanism according to the embodiment of the present disclosure is not applied is about 6%. That is, with the verification area of the transaction, the total overhead of the system is reduced by about 94%. Therefore, the adopt of the verification area of the transaction in the verification mechanism according to the embodiment of the present disclosure will reduce the total overhead of the system significantly.

Figure 21:
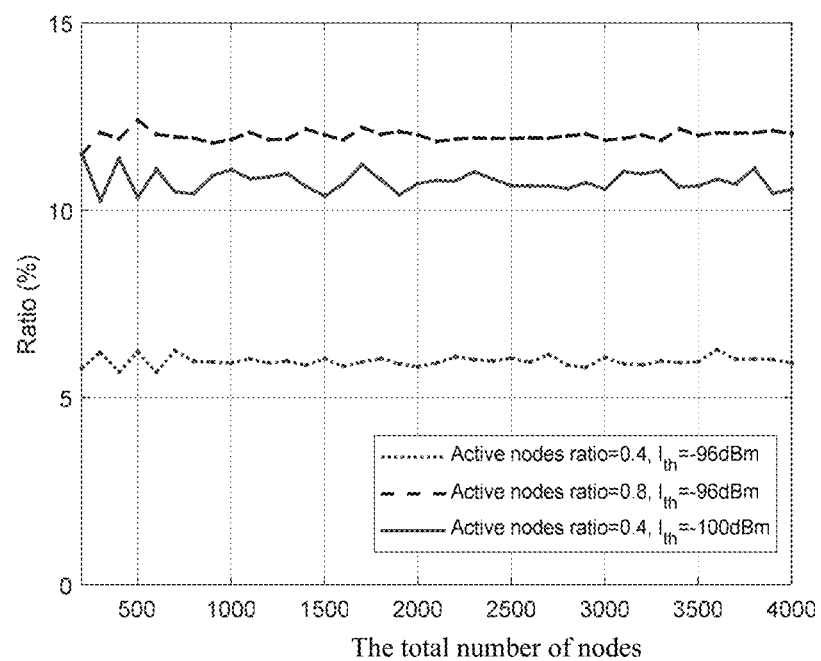
FIG. 21 shows a relationship between active nodes ratio, a pre-determined interference threshold set for spectrum transaction, and a ratio of the total number of verifications in a case of applying the mechanism verification according to the embodiment of the present disclosure and the total number of verifications in a case of not applying the mechanism verification according to the embodiment of the present disclosure.

FIG. 21 shows a relationship between active nodes ratio, a pre-determined interference threshold $I_{th}$ set for spectrum transaction, and a ratio Ratio of the total number of verifications in a case of applying the mechanism verification according to the embodiment of the present disclosure and the total number of verifications in a case of not applying the mechanism verification according to the embodiment of the present disclosure. It follows from FIG. 21 that, Ratio is decreased with decreasing of the active nodes ratio, and Ratio is decreased with increasing of the pre-determined interference threshold set for the spectrum transaction.

A base station for wireless communication is further provided according to the present disclosure. The base station includes the electronic device 100 descried above.

A user equipment for wireless communication is further provided according to the present disclosure. The user equipment includes the electronic device 100 described above.

In the process of describing the electronic device for wireless communication in the above embodiments, some processing or methods are disclosed apparently. The summary of the methods is given without repeating some details discussed above in the following. It should be noted that, although these methods are disclosed in the process of describing the electronic device for wireless communication, these methods do not necessarily employ those components as described or are not necessarily executed by those components. For example, the electronic device for wireless communication may be completely or partially implemented by hardware and/or firmware. The method for wireless communication discussed below may be completely implemented by computer executable programs, although the method may be implemented by hardware and/or firmware of the electronic device for wireless communication.

Figure 22:
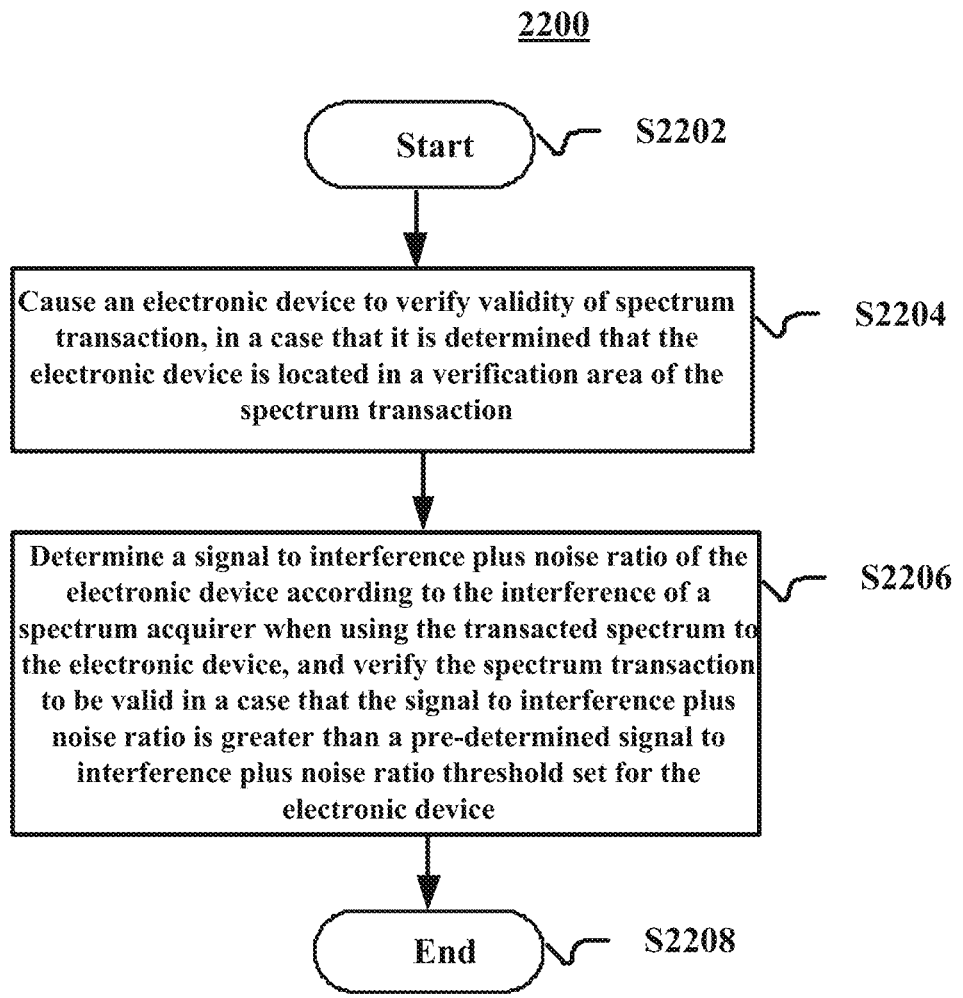
FIG. 22 shows a flowchart of a method for wireless communication according to an embodiment of the present disclosure.

FIG. 22 shows a flowchart of a method 2200 for wireless communication according to an embodiment of the present disclosure. The method 2200 starts from step S2202. In step S2204, in a case that it is determined that the electronic device is located in a verification area of spectrum transaction, the electronic device is caused to verify validity of the spectrum transaction. The verification area is determined based on an interference caused when a spectrum acquirer in the spectrum transaction uses the transacted spectrum. In step S2206, a signal to interference plus noise ratio of the electronic device is determined based on the interference of the spectrum acquirer when using the transacted spectrum to the electronic device. In a case that the signal to interference plus noise ratio is greater than a pre-determined signal to interference plus noise ratio threshold set for the electronic device, the spectrum transaction is verified to be valid. The method 2200 ends at step S2208. The method 2200 may be performed at a base station side or a user equipment side.

The method may be performed by the electronic device 100 described above. For details, one may refer to the description of the device embodiments. Details are not repeated herein.

It should be noted that, the above methods may be used alone or in combination.

The technology of the present disclosure may be applied to various products.

For example, the electronic device 100 may be realized as various base stations. The base station may be implemented as an evolved Node B (eNB) of any type or gNB (5G base station). The eNB includes a macro eNB and a small eNB. The small eNB may be an eNB such as a pico eNB, a micro eNB and a home (femto) eNB that covers a cell smaller than a macro cell. Similar cases adapt to the gNB. Alternatively, the base station may also be implemented as a base station of any other type, such as a NodeB and a base transceiver station (BTS). The base station may include a main body (that is also referred to as a base station device) configured to control wireless communication, and one or more remote radio heads (RRH) disposed in a different place from the main body. In addition, various types of user equipments, which will be described below, may each operate as the base station by temporarily or semi-persistently executing a base station function.

The electronic apparatus 100 may be implemented as various user equipment. The user equipment may be implemented as a mobile terminal (such as a smartphone, a tablet personal computer (PC), a notebook PC, a portable game terminal, a portable/dongle type mobile router, and a digital camera), or an in-vehicle terminal (such as a car navigation device). The user equipment may also be realized as a terminal (that is also referred to as a machine type communication (MTC) terminal) that performs machine-to-machine (M2M) communication. Furthermore, the user equipment may be a wireless communication module (such as an integrated circuit module including a single die) mounted on each of the terminals.

[Application Examples of a Base Station]

First Application Example

Figure 23:
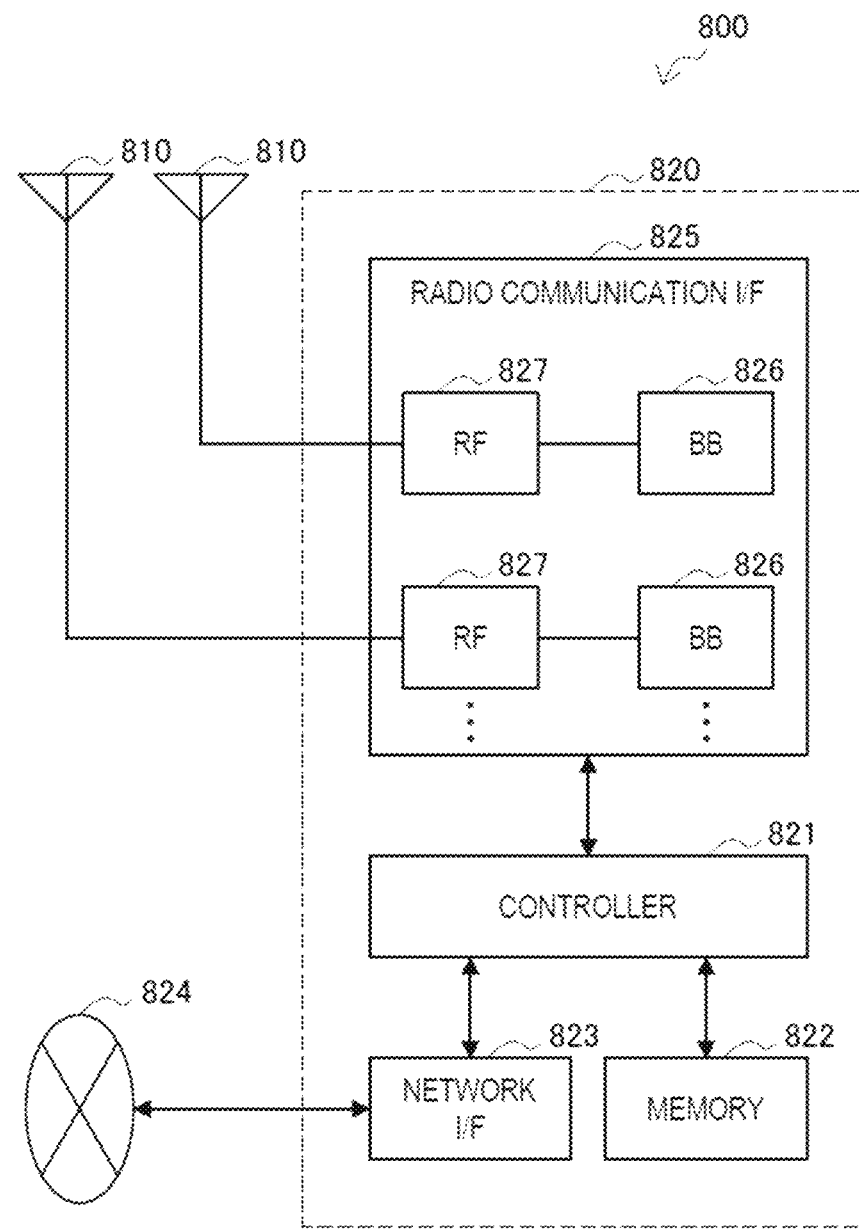
FIG. 23 is a block diagram showing a first example of schematic configurations of eNB or gNB to which the technology of the present disclosure may be applied.

FIG. 23 is a block diagram showing a first example of a schematic configuration of an eNB or gNB to which the technology of the present disclosure may be applied. It should be noted that the following description is made by taking eNB as an example, and the description also adapts to the gNB. An eNB 800 includes one or more antennas 810 and a base station device 820. The base station device 820 and each of the antennas 810 may be connected with each other via an RF cable.

Each of the antennas 810 includes one or more antenna elements (such as multiple antenna elements included in a multiple-input multiple-output (MIMO) antenna), and is used for transmitting and receiving a radio signal by the base station device 820. The eNB 800 may include the multiple antennas 80, as shown in FIG. 23. For example, the multiple antennas 810 may be compatible with multiple frequency bands used by the eNB 800. Although FIG. 23 illustrates an example in which the eNB 800 includes multiple antennas 810, the eNB 800 may also include a single antenna 810.

The base station device 820 includes a controller 821, a memory 822, a network interface 823, and a radio communication interface 825.

The controller 821 may be a CPU or a DSP and control various functions of higher layers of the base station device 820. For example, the controller 821 generates a data packet based on data in a signal processed by the radio communication interface 825, and transfers the generated packet via a network interface 823. The controller 821 may bundle data from multiple baseband processors to generate bundled packet, and transfer the generated bundled packet. The controller 821 may have logical functions of performing control such as radio resource control, radio bearer control, mobility management, admission control, and scheduling. The control may be performed in conjunction with an adjacent eNB or a core network node. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800 and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, it may use a higher frequency band for wireless communication than a frequency band used by the radio communication interface 825.

The radio communication interface 825 supports any cellular communication scheme (such as Long Term Evolution (LTE) and LTE-Advanced), and provides wireless connection to a terminal positioned in a cell of the eNB 800 via the antenna 810. The radio communication interface 825 may typically include, for example, a base band (BB) processor 826 and an RF circuit 827. The BB processor 826 may perform, for example, coding/decoding, modulation/demodulation and multiplexing/de-multiplexing, and perform various types of signal processes of the layers (for example L1, media access control (MAC), radio link control (RLC) and packet data convergence protocol (PDCP)). Instead of the controller 821, the BB processor 826 may have a part or all of the above-described logical functions. The BB processor 826 may be a memory that stores the communication control program, or a module that includes a processor and related circuitry configured to perform the program. In this way, the function of the BB processor 826 may be changed when the programs are updated. The module may be a card or a blade that is inserted into a slot of the base station device 820. Alternatively, the module may be a chip that is mounted on the card or the blade. Meanwhile, the RF circuit 827 may include, for example, a frequency mixer, a filter and an amplifier, and transmit and receive a radio signal via the antenna 810.

As shown in FIG. 23, the radio communication interface 825 may include multiple BB processors 826. For example, multiple BB processors 826 may be compatible with multiple frequency bands used by the eNB 800. As shown in FIG. 23, the radio communication interface 825 may include multiple RF circuits 827. For example, the multiple RF circuits 827 may be compatible with multiple antenna elements. Although an example in which the radio communication interface 825 includes multiple BB processors 826 and multiple RF circuits 827 is shown in FIG. 23, the radio communication interface 825 may also include a single BB processor 826 or a single RF circuit 827.

In the eNB 800 shown in FIG. 23, a transceiver of the electronic device 100 may be implemented as the radio communication interface 825. At least a part of functions may be implemented by the controller 821. For example, the controller 821 may verify the spectrum transaction by performing functions of the determination unit 101 and the verification unit 103.

Second Application Example

Figure 24:
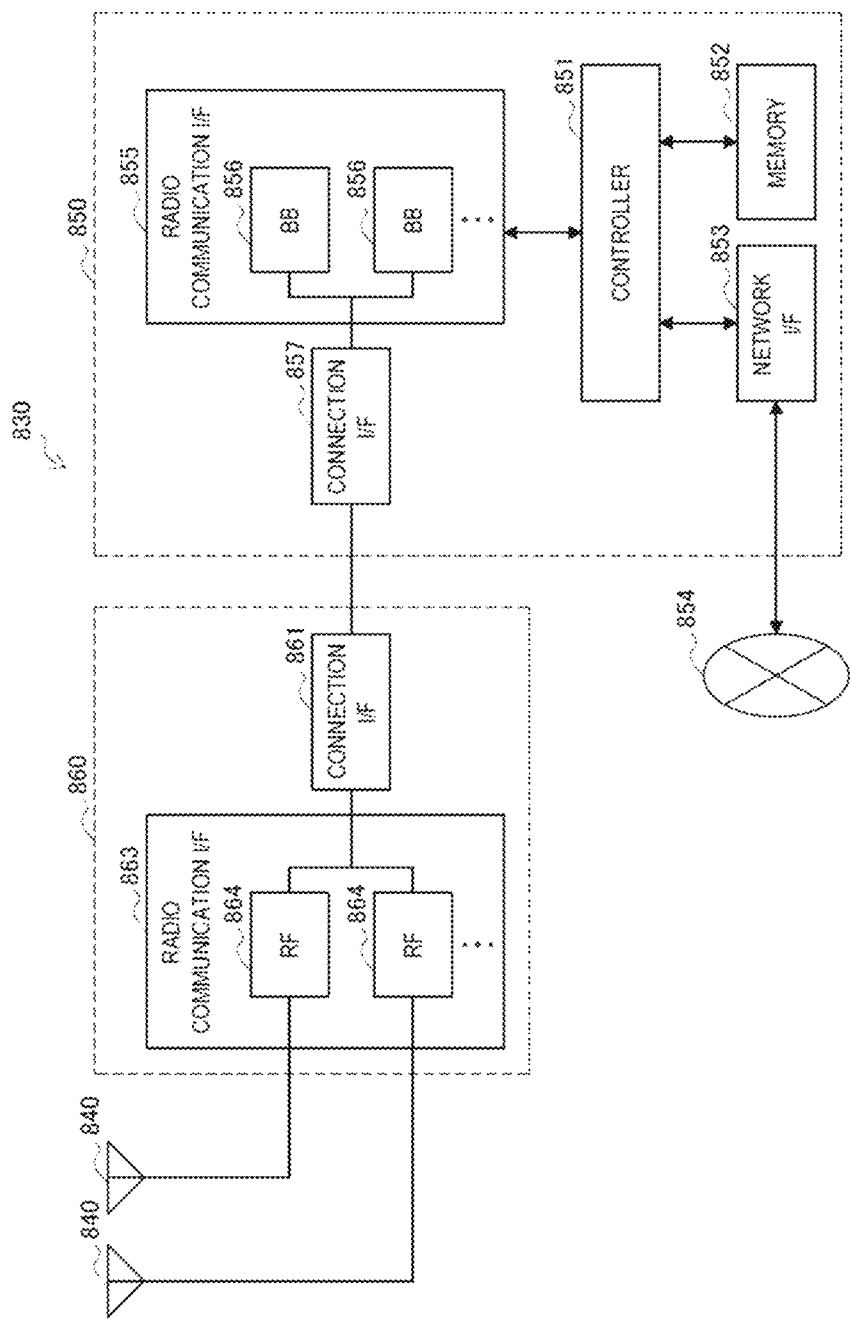
FIG. 24 is a block diagram showing a second example of schematic configurations of eNB or gNB to which the technology of the present disclosure may be applied.

FIG. 24 is a block diagram showing a second example of a schematic configuration of the eNB or gNB to which the technology according to the present disclosure may be applied. Similarly, the following description is made by taking the eNB as an example, and the description also adapts to the gNB. An eNB 830 includes one or more antennas 840, a base station device 850 and an RRH 860. Each antenna 840 and the RRH 860 may be connected to each other via an RF cable. The base station device 850 and the RRH 860 may be connected to each other via a high-speed line such as a fiber cable.

Each of the antennas 840 includes one or more antenna elements (such as the multiple antenna elements included in the MIMO antenna), and is used for transmitting and receiving the radio signal by the RRH 860. As shown in FIG. 24, the eNB 830 may include multiple antennas 840. For example, the multiple antennas 840 may be compatible with multiple frequency bands used by the eNB 830. Although an example in which the eNB 830 includes multiple antennas 840 is shown in FIG. 24, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 23.

The radio communication interface 855 supports any cellular communication solution (such as LTE and LTE-advanced), and provides wireless communication with a terminal located in a sector corresponding to the RRH 860 via the RRH 860 and the antenna 840. The radio communication interface 855 may typically include, for example, a BB processor 856. Other than connecting to an RF circuit 864 of the RRH 860 via the connection interface 857, the BB processor 856 is the same as the BB processor 826 described with reference to FIG. 23. As show in FIG. 24, the radio communication interface 855 may include multiple BB processors 856. For example, the multiple BB processors 856 may be compatible with the multiple frequency bands used by the eNB 830. Although FIG. 24 illustrates an example in which the radio communication interface 855 includes multiple BB processors 856, the radio communication interface 855 may also include a single BB processor 856.

The connection interface 857 is an interface for connecting the base station device 850 (the radio communication interface 855) to the RRH 860. The connection interface 857 may also be a communication module for communication in the above-described high-speed line that connects the base station device 850 (the radio communication interface 855) to the RRH 860.

The RRH 860 includes a connection interface 861 and a radio communication interface 863.

The connection interface 861 is an interface for connecting the RRH 860 (the radio communication interface 863) to the base station device 850. The connection interface 861 may also be a communication module for the communication in the above high-speed line.

The radio communication interface 863 transmits and receives a radio signal via the antenna 840. The radio communication interface 863 may generally include, for example, the RF circuit 864. The RF circuit 864 may include, for example, a frequency mixer, a filter and an amplifier, and transmit and receive a radio signal via the antenna 840. The radio communication interface 863 may include multiple RF circuits 864, as shown in FIG. 24. For example, the multiple RF circuits 864 may support multiple antenna elements. Although FIG. 24 illustrates the example in which the radio communication interface 863 includes the multiple RF circuits 864, the radio communication interface 863 may also include a single RF circuit 864.

In the eNB 830 shown in FIG. 24, a transceiver of the electronic device 100 may be implemented by the radio communication interface 825. At least part of the functions may also be realized by the controller 851. For example, the controller 851 may verify the spectrum transaction by performing functions of the determination unit 101 and the verification unit 103.

[Application Examples of User Equipment]

First Application Example

Figure 25:
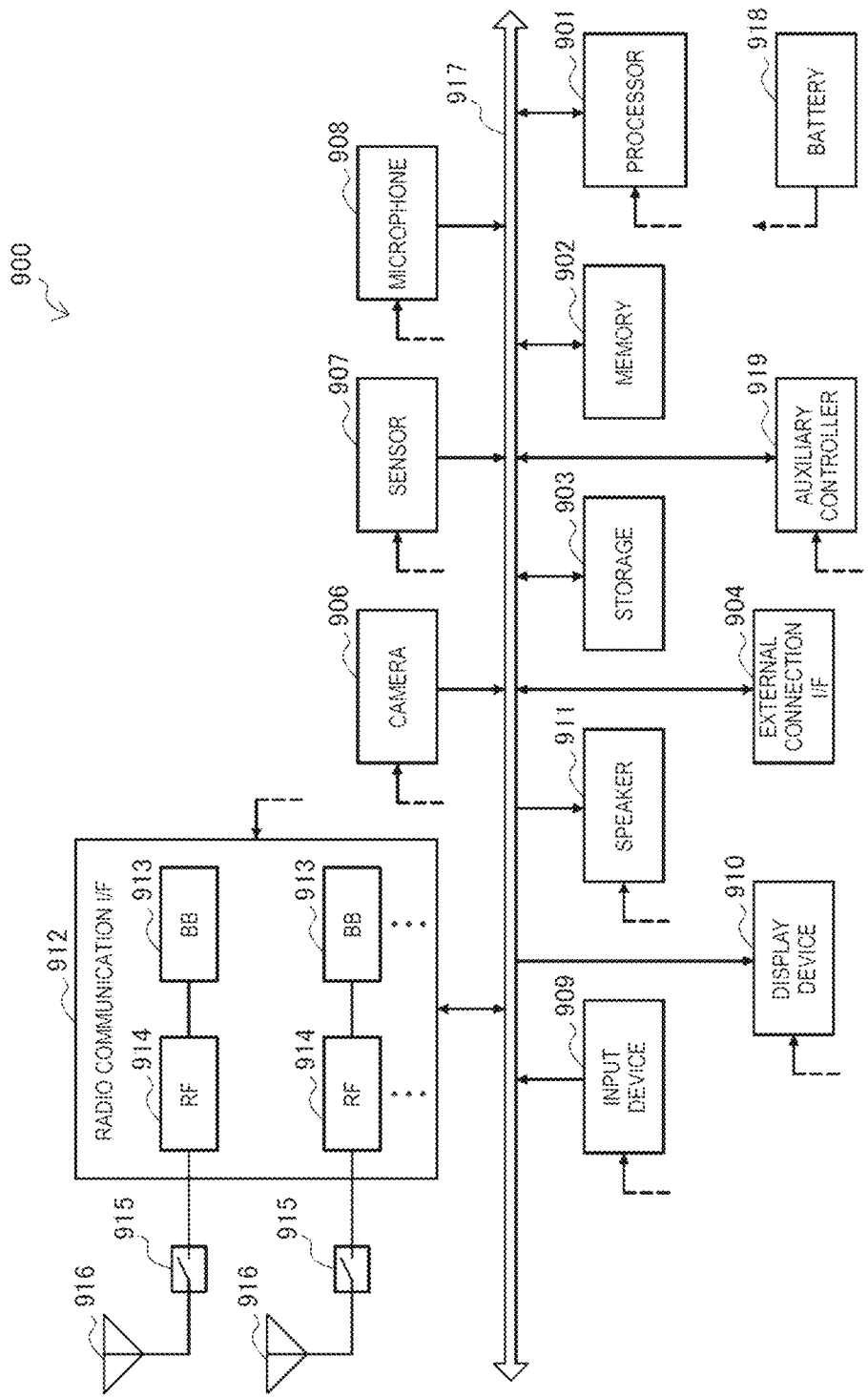
FIG. 25 is a block diagram showing an example of schematic configurations of a smart phone to which the technology of the present disclosure may be applied.

FIG. 25 is a block diagram showing an example of exemplary configuration of a smartphone 900 to which the technology of the present disclosure may be applied. The smart phone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918 and an auxiliary controller 919.

The processor 901 may be, for example, a CPU or a system on chip (SoC), and control functions of an application layer and other layers of the smart phone 900. The memory 902 includes an RAM and a ROM, and stores a program that is executed by the processor 901 and data. The storage 903 may include a storage medium such as a semiconductor memory and a hard disk. The external connection interface 904 is an interface for connecting an external apparatus (such as a memory card and a universal serial bus (USB) apparatus) to the smart phone 900.

The camera 906 includes an image sensor such as a charge coupled apparatus (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are inputted to the smart phone 900 into audio signals. The input device 909 includes, for example, a touch sensor configured to detect touch onto a screen of the display device 910, a keypad, a keyboard, a button, or a switch, and receive an operation or information inputted from a user. The display device 910 includes a screen such as a liquid crystal display (LCD) and an organic light-emitting diode (OLED) display, and displays an output image of the smart phone 900. The speaker 911 converts audio signals that are outputted from the smartphone 900 to sounds.

The radio communication interface 912 supports any cellular communication scheme (such as LTE and LTE-Advanced), and performs wireless communication. The radio communication interface 912 may typically include, for example, a base band (BB) processor 913 and an RF circuit 914. The BB processor 913 may perform encoding/decoding, modulating/demodulating and multiplexing/demultiplexing, for example, and perform various types of signal processing for wireless communication. The RF circuit 914 may include a frequency mixer, a filter and an amplifier, for example, and transmit and receive a radio signal via the antenna 916. It should be noted that, although FIG. 25 shows a case that one RF link is connected to one antenna, which is only schematic, and one RF link may be connected to multiple antennas via multiple phase shifters is further included. The radio communication interface 912 may be a chip module having the BB processor 913 and the RF circuit 914 integrated thereon. The radio communication interface 912 may include multiple BB processors 913 and multiple RF circuits 914, as shown in FIG. 25. Although FIG. 25 illustrates the example in which the radio communication interface 912 includes the multiple BB processors 913 and the multiple RF circuits 914, the radio communication interface 912 may also include a single BB processor 913 or a single RF circuit 914.

Moreover, in addition to a cellular communication scheme, the radio communication interface 912 may also support a wireless communication scheme of another type, such as a short-distance wireless communication scheme, a near field communication scheme, and a wireless local area network (LAN) scheme. In this case, the radio communication interface 912 may include a BB processor 913 and an RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes one or more antenna elements (such as multiple antenna elements included in an MIMO antenna), and is used for the radio communication interface 912 to transmit and receive radio signals. The smartphone 900 may include the multiple antennas 916, as shown in FIG. 25. Although FIG. 25 illustrates the example in which the smartphone 900 includes the multiple antennas 916, the smartphone 900 may also include a single antenna 916.

In addition, the smart phone 900 may include an antenna 916 for each wireless communication scheme. In this case, the antenna switches 915 may be omitted from the configuration of the smart phone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to each block of the smartphone 900 shown in FIG. 25 via feeders which are partially shown by dashed lines in the figure. The auxiliary controller 919 operates a minimum necessary function of the smartphone 900, for example, in a sleep mode.

The electronic device 100 may be implemented as the smart phone 900 shown in FIG. 25, and a transceiver of the electronic device 100 may be implemented by radio communication interface 912. At least a part of functions may be implemented by the processor 901 or the auxiliary controller 919. For example, the processor 901 or the auxiliary controller 919 may verify the spectrum transaction by performing functions of the determination unit 101 and the verification unit 103.

Second Application Example

Figure 26:
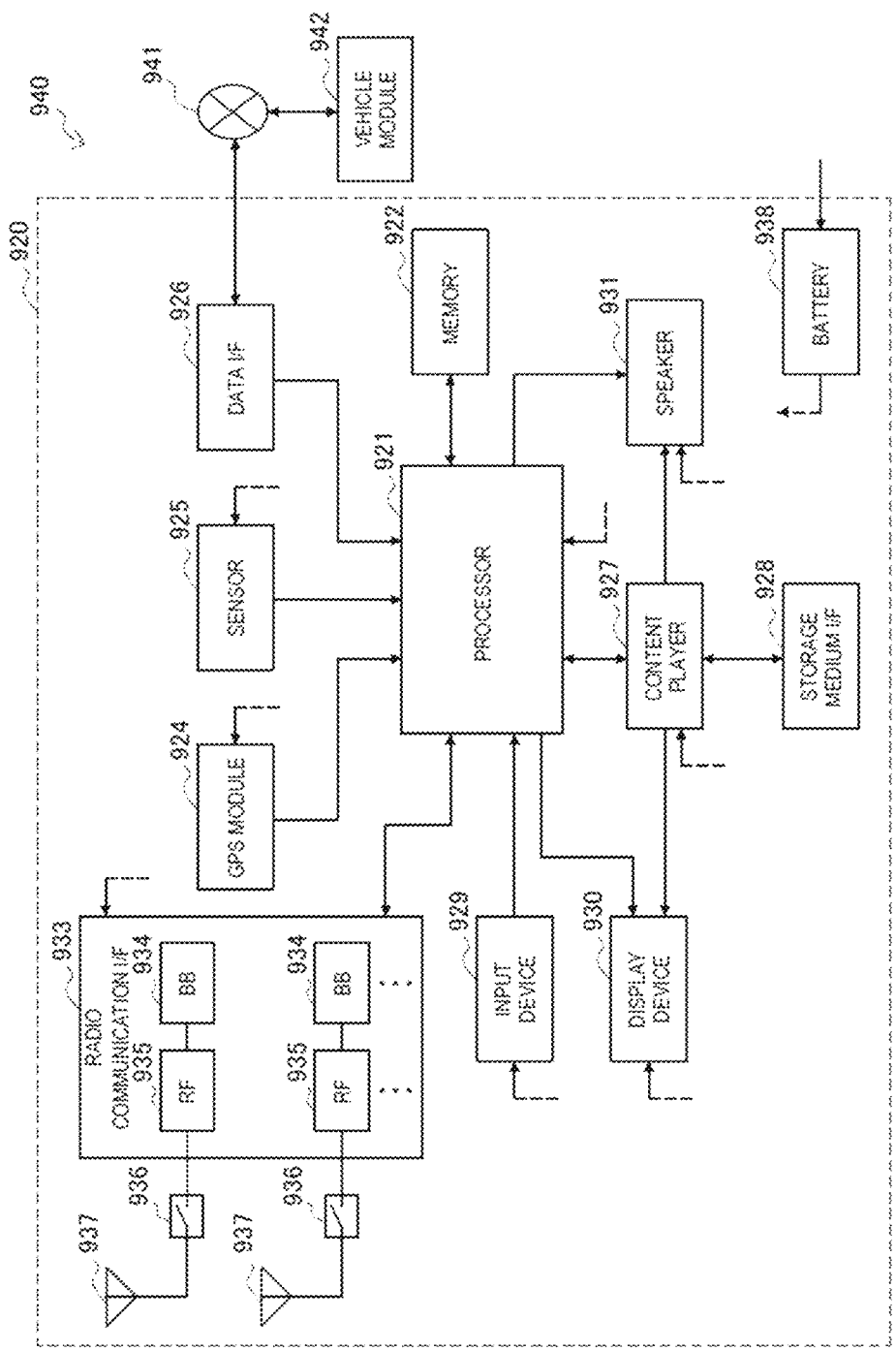
FIG. 26 is a block diagram showing an example of schematic configurations of a vehicle navigation device to which the technology of the present disclosure may be applied.

FIG. 26 is a block diagram showing an example of a schematic configuration of a vehicle navigation apparatus 920 to which the technology according to the present disclosure may be applied. The vehicle navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be for example the CPU or the SoC, and control the navigation function and other functions of the vehicle navigation apparatus 920. The memory 922 includes an RAM and a ROM, and stores a program that is executed by the processor 921 and data.

The GPS module 924 determines a position (such as latitude, longitude, and altitude) of the vehicle navigation apparatus 920 by using GPS signals received from a GPS satellite. The sensor 925 may include a group of sensors such as a gyroscope sensor, a geomagnetic sensor and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch on a screen of the display device 930, a button, or a switch, and receives an operation or information inputted from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme (such as LTE and LTE-advanced) and performs wireless communication. The radio communication interface 933 may typically include, for example, a BB processor 934 and an RF circuit 935. The BB processor 934 may perform encoding/decoding, modulating/demodulating and multiplexing/demultiplexing, for example, and perform various types of signal processing for wireless communication. The RF circuit 935 may include a mixer, a filter and an amplifier, for example, and transmit and receive a radio signal via the antenna 937. The radio communication interface 933 may also be one chip module that has the BB processor 934 and the RF circuit 935 integrated thereon. The radio communication interface 933 may include multiple BB processors 934 and multiple RF circuits 935, as shown in FIG. 26. Although FIG. 26 shows the example in which the radio communication interface 933 includes the multiple BB processors 934 and the multiple RF circuits 935, the radio communication interface 933 may also include a single BB processor 934 or a single RF circuit 935.

In addition to the cellular communication scheme, the radio communication interface 933 may also support a wireless communication scheme of another type, such as a short-distance wireless communication scheme, a near field communication scheme, and a wireless LAN scheme. In this case, the radio communication interface 933 may include a BB processor 934 and an RF circuit 935 for each wireless communication scheme.

Each of the antenna switches 936 switches connection destinations of the antenna 937 among multiple circuits (such as circuits for different wireless communication schemes) included in the radio communication interface 933.

Each of the antennas 937 includes one or more antenna elements (such as multiple antenna elements included in the MIMO antenna), and is used for the radio communication interface 933 to transmit and receive a radio signal. The vehicle navigation apparatus 920 may include multiple antennas 937, as shown in FIG. 26. Although FIG. 26 illustrates the example in which the vehicle navigation apparatus 920 includes the multiple antennas 937, the vehicle navigation apparatus 920 may also include a single antenna 937.

Furthermore, the vehicle navigation apparatus 920 may include the antenna 937 for each wireless communication scheme. In that case, the antenna switches 936 may be omitted from the configuration of the vehicle navigation apparatus 920.

The battery 938 supplies power to each block of the vehicle navigation apparatus 920 shown in FIG. 26 via feeders which are partially shown by dashed lines in the figure. The battery 938 accumulates power supplied from the vehicle.

The electronic device 100 may be implemented as the vehicle navigation apparatus 920 shown in FIG. 26, and a transceiver of the electronic device 100 may be implemented as the radio communication interface 912. At least a part of functions may be implemented by the processor 921. For example, the processor 921 may verify the spectrum transaction by performing functions of the determination unit 101 and the verification unit 103.

The technology of the present disclosure may also be implemented as an in-vehicle system (or a vehicle) 940 including one or more of the blocks of the vehicle navigation apparatus 920, an in-vehicle network 941 and a vehicle module 942. The vehicle module 942 generates vehicle data such as vehicle speed, engine speed, and fault information, and outputs the generated data to the in-vehicle network 941.

Basic principles of the present disclosure are described above in conjunction with embodiments. However, it is to be noted that for those skilled in the art, it should be understood that the whole or any steps or components of the methods and apparatuses of the present disclosure may be implemented by hardware, firmware, software or their combinations in any computing devices (including processors, storage mediums and the like) or a network of the computing devices, which can be realized by those skilled in the art with their basic circuit design knowledge or basic programming skills after reading the descriptions of the present disclosure.

A program product storing machine readable instruction codes is further provided according to the embodiments of the present disclosure. When read and executed by a machine, the instruction codes cause the machine to perform the method according to the embodiment of the present disclosure.

Accordingly, a storage medium for carrying the program product storing the machine readable instruction codes is further provided according to the present disclosure. The storage medium includes but not limited to a floppy disk, an optical disk, a magnetic-optical disk, a storage card and a memory stick and so on.

In a case of implementing by software or firmware, programs consisting of the software are installed to a computer with a dedicated hardware structure (for example a general-purpose computer 2700 shown in FIG. 27) from the storage medium or the network. The computer can perform various types of functions when installed with various types of programs.

Figure 27:
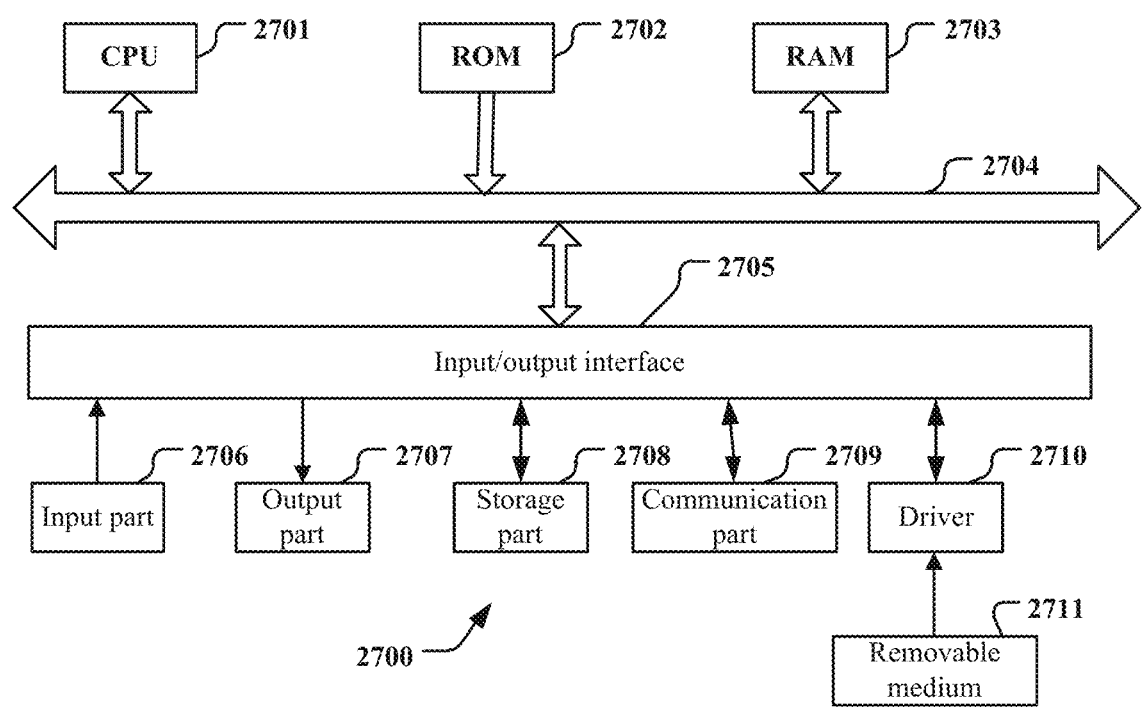
FIG. 27 is a block diagram showing a schematic structure of a general purpose personal computer for implementing the method and/or the apparatus and/or the system according to the embodiment of the present disclosure.

In FIG. 27, a central processing unit (CPU) 2701 performs various types of processing according to programs stored in a read only memory (ROM) 2702 or programs loaded from a storage part 2708 to a random access memory (RAM) 2703. Data required when the CPU 2701 performs various types of processing is also stored in the RAM 2703 as needed. The CPU 2701, the ROM 2702 and the RAM 2703 are linked to each other via a bus 2704. An input/output interface 2705 is also linked to the bus 2704.

The following components are linked to the input/output interface 2705: an input part 2706 (including a keyboard, and a mouse and so on), an output part 2707 (including a display, for example a cathode ray tube (CRT) and a liquid crystal display (LCD), and a speaker), a storage part 2708 (including a hard disk and so on), and a communication part 2709 (including a network interface card for example a LAN card, and a modem). The communication part 2709 performs communication processing over a network for example the Internet. A driver 2710 may also be linked to the input/output interface 2705 as needed. A removable medium 2711 for example a magnetic disk, an optical disk, a magnetic-optical disk and a semiconductor memory may be installed on the driver 2710 as needed, such that computer programs read from the removable medium 2711 are installed on the storage part 2708 as needed.

In a case of performing the series of processing described above by software, programs consisting of the software are installed from the network for example the Internet or the storage medium for example the removable medium 2711.

Those skilled in the art should understand that the storage medium is not limited to the removable medium 2711 shown in FIG. 27 which stores programs and is distributed separately from the device to provide the programs to the user. Examples of the removable medium 2711 include: a magnetic disk (including a floppy disk (registered trademark), an optical disk (including a compact disk read only memory (CD-ROM) and a digital versatile disk (DVD)), a magnetic-optical disk (including a mini disk (MD) (registered trademark)), and a semiconductor memory. Alternatively, the storage medium may be a hard disk included in the ROM 2702 and the storage part 2708 which stores programs. The storage medium and the device including thereof together are distributed to the user.

It is to be noted that, according to apparatus, methods and systems described in the present disclosure, it is apparent that each component and each step can be decomposed and/or recombined. These decomposition and/or recombination shall be considered as equivalents of the present disclosure. Also, steps for executing the above-described series of processing can be naturally performed in chronological order in the order described, but are not necessarily performed in chronological order. Some steps may be performed in parallel or independently from each other.

In addition, it is to be noted that, in this specification, terms of "include", "comprise" or any other variants are intended to be non-exclusive. Therefore, a process, method, article or device including multiple elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

The technology of the present disclosure may also be implemented by the following technical solutions.

Item (1). An electronic device for wireless communication, comprising:
    a processing circuit configured to:
    verify validity of a spectrum transaction if it is determined that the electronic device is located in a validation area of the spectrum transaction, wherein the validation area is determined based on an interference caused by a spectrum acquirer in the spectrum transaction when using the transacted spectrum; and
    determine a signal to interference plus noise ratio of the electronic device based on an interference of the spectrum acquirer when using the transacted spectrum to the electronic device, and verify the spectrum transaction to be valid in a case that the signal to interference plus noise ratio is greater than a pre-determined signal to interference plus noise ratio threshold set for the electronic device.

Item (2). The electronic device according to Item (1), wherein the validation area is an area in which the interference caused by the spectrum acquirer when using the transacted spectrum is larger than a pre-determined interference threshold set for the spectrum transaction.

Item (3). The electronic device according to Item (2), wherein the validation area is a circular area of which a center is the spectrum acquirer, and a radius of the circular area is calculated based on transmission power information of the spectrum acquirer included in information of the spectrum transaction and the pre-determined interference threshold.

Item 4. The electronic device according to any one of Items (1) to (3), wherein the processing circuit is configured to calculate a distance between the spectrum acquirer and the electronic device based on position information of the spectrum acquirer and position information of the electronic device, and calculate the interference of the spectrum acquirer to the electronic device based on the distance and the transmission power information of the spectrum acquirer.

Item (5). The electronic device according to any one of Items (1) to (4), wherein the processing circuit is configured to calculate a credit value of the spectrum acquirer and a spectrum provider as transaction party of the spectrum transaction, and verify validity of the spectrum transaction in a case that the credit value of the transaction parties is greater than a pre-determined credit threshold.

Item (6). The electronic device according to Item (5), wherein the processing circuit is configured to calculate the credit value of the transaction party based on at least one of historic transaction information of the transaction party, a total number of spectrums held by the transaction party and information of the transaction party provided in information of the spectrum transaction, wherein the credit value of the transaction party is decreased due to bad transaction recording in the historic transaction information, and in a case that no bad transaction recording is included in the historical transaction information, the credit value of the transaction party is larger as a historical credit value in the historical transaction information is larger;

the credit value of the transaction party is larger as the total number of spectrum held by the transaction party is larger; and the credit value of the transaction party is larger as the number and/or type of the transaction party information is larger, wherein the transaction party information comprises at least one of position information, the transmission power information and information about the held spectrums of the transaction party.

Item (7). The electronic device according to any one of Items (1) to (6), wherein the electronic device is a main body in a decentralized spectrum management system, wherein the decentralized spectrum management system includes a plurality of main bodies, the plurality of main bodies include the spectrum acquirer and a spectrum provider as transaction party of the spectrum transaction, the plurality of main bodies respectively hold database copies that are the same as each other, and wherein the database copy held respectively by the plurality of main bodies is updated based on information of the spectrum transaction verified to be valid.

Item (8). The electronic device according to Item (7), wherein the processing circuit is configured to: in a case that the electronic device competes for a right to record the spectrum transaction among the plurality of main bodies so that the electronic device becomes an electronic device having an accounting right, add a size of the validation area calculated based on the information of the spectrum transaction to the information of the spectrum transaction and transmit the information of the spectrum transaction to other main bodies.

Item (9). The electronic device according to Item (8), wherein if the plurality of main bodies determine that they are located in the validation area based on the size of the validation area, the plurality of main bodies respectively verify the spectrum transaction and transmit a verification result to the electronic device having the accounting right, and the processing circuit is configured to: calculate a final verification result based on verification results received from each main body located in the validation area, and transmit the final verification result to the other main bodies.

Item (10). The electronic device according to Item (8), wherein each of the plurality of main bodies determine sequentially whether it is located in the validation area of the spectrum transaction, and if the main body determines that it is located in the validation area, the main body verifies the spectrum transaction, and transmits a result to main bodies among the plurality of main bodies that do not perform the determination.

Item (11). The electronic device according to Item (10), wherein the determination is started from a determination starting body.

Item (12). The electronic device according to Item (10) or (11), wherein a determination ending body calculates a final verification result based on verification results of all main bodies located in the verification area, and transmits the final verification result to other main bodies.

Item (13). The electronic device according to Item (9) or (12), wherein in a case that each of the plurality of main bodies agrees with the final verification result, each main body stores the information of spectrum transaction in a database copy held by each main body.

Item (14). The electronic device according to Item (8), wherein the spectrum transaction comprises a plurality of spectrum transactions; and the processing circuit is configured to calculate, according to information of each of the plurality of spectrum transactions, a size of a verification area corresponding to the spectrum transaction, and add the calculated size of the verification area to the information of the spectrum transaction.

Item (15). The electronic device according to any one of Items (7) to (14), wherein the spectrum management system is an ultra-dense network.

Item (16). A method for wireless communication, comprising:

causing an electronic device to verify validity of a spectrum transaction if it is determined that the electronic device is located in a validation area of the spectrum transaction, wherein the validation area is determined based on an interference caused by a spectrum acquirer in the spectrum transaction when using the transacted spectrum; and determining a signal to interference plus noise ratio of the electronic device based on an interference of the spectrum acquirer when using the transacted spectrum to the electronic device, and verifying the spectrum transaction to be valid in a case that the signal to interference plus noise ratio is greater than a pre-determined signal to interference plus noise ratio threshold set for the electronic device.

Item (17). A computer-readable storage medium storing a computer-executable instruction that, when executed, causes the method for wireless communication according to Item (16) to be performed.

Item (18). A base station for wireless communication, comprising the electronic device according to any one of Items (1) to (15).

Item (19). A user equipment for wireless communication, comprising the electronic device according to any one of Items (1) to (15).

Although embodiments of the present disclosure are described in detail with reference to the drawings above, it should be noted that the described embodiments are only intended to illustrate the present disclosure rather than limit the present disclosure. Those skilled in the art may make various changes and modifications to the above embodiments without departing from the essence and scope of the present disclosure. The scope of the present disclosure is defined by only the appended claims and equivalent meaning thereof.

The invention claimed is:

1. An electronic device for wireless communication, comprising:
a processing circuit configured to:
verify validity of a spectrum transaction if it is determined that the electronic device is located in a validation area of the spectrum transaction, wherein the validation area is determined based on an interference caused by a spectrum acquirer in the spectrum transaction when using the transacted spectrum; and
determine a signal to interference plus noise ratio of the electronic device based on an interference of the spectrum acquirer when using the transacted spectrum to the electronic device, and verify the spectrum transaction to be valid in a case that the signal to interference plus noise ratio is greater than a pre-determined signal to interference plus noise ratio threshold set for the electronic device.

2. The electronic device according to claim 1, wherein the validation area is an area in which the interference caused by the spectrum acquirer when using the transacted spectrum is larger than a pre-determined interference threshold set for the spectrum transaction.

3. The electronic device according to claim 2, wherein the validation area is a circular area of which a center is the spectrum acquirer, and a radius of the circular area is calculated based on transmission power information of the spectrum acquirer included in information of the spectrum transaction and the pre-determined interference threshold.

4. The electronic device according to claim 1, wherein the processing circuit is configured to calculate a distance between the spectrum acquirer and the electronic device based on position information of the spectrum acquirer and position information of the electronic device, and calculate the interference of the spectrum acquirer to the electronic device based on the distance and the transmission power information of the spectrum acquirer.

5. The electronic device according to claim 1, wherein the processing circuit is configured to calculate a credit value of the spectrum acquirer and a spectrum provider as transaction party of the spectrum transaction, and verify validity of the spectrum transaction in a case that the credit value of the transaction parties is greater than a pre-determined credit threshold.

6. The electronic device according to claim 5, wherein the processing circuit is configured to calculate the credit value of the transaction party based on at least one of historic transaction information of the transaction party, a total number of spectrums held by the transaction party and information of the transaction party provided in information of the spectrum transaction, wherein
the credit value of the transaction party is decreased due to bad transaction recording in the historic transaction information, and in a case that no bad transaction recording is included in the historical transaction information, the credit value of the transaction party is larger as a historical credit value in the historical transaction information is larger;
the credit value of the transaction party is larger as the total number of spectrum held by the transaction party is larger; and
the credit value of the transaction party is larger as the number and/or type of the transaction party information is larger, wherein the transaction party information comprises at least one of position information, the transmission power information and information about the held spectrums of the transaction party.

7. The electronic device according to claim 1, wherein the electronic device is a main body in a decentralized spectrum management system, wherein the decentralized spectrum management system includes a plurality of main bodies, the plurality of main bodies include the spectrum acquirer and a spectrum provider as transaction party of the spectrum transaction, the plurality of main bodies respectively hold database copies that are the same as each other, and wherein the database copy held respectively by the plurality of main bodies is updated based on information of the spectrum transaction verified to be valid.

8. The electronic device according to claim 7, wherein the processing circuit is configured to: in a case that the electronic device competes for a right to record the spectrum transaction among the plurality of main bodies so that the electronic device becomes an electronic device having an accounting right, add a size of the validation area calculated based on the information of the spectrum transaction to the information of the spectrum transaction and transmit the information of the spectrum transaction to other main bodies.

9. The electronic device according to claim 8, wherein
if the plurality of main bodies determine that they are located in the validation area based on the size of the validation area, the plurality of main bodies respectively verify the spectrum transaction and transmit a verification result to the electronic device having the accounting right, and
the processing circuit is configured to: calculate a final verification result based on verification results received from each main body located in the validation area, and transmit the final verification result to the other main bodies.

10. The electronic device according to claim 9, wherein in a case that each of the plurality of main bodies agrees with the final verification result, each main body stores the information of spectrum transaction in a database copy held by each main body.

11. The electronic device according to claim 8, wherein each of the plurality of main bodies determine sequentially whether it is located in the validation area of the spectrum transaction, and if the main body determines that it is located in the validation area, the main body verifies the spectrum transaction, and transmits a result to main bodies among the plurality of main bodies that do not perform the determination.

12. The electronic device according to claim 11, wherein the determination is started from a determination starting body.

13. The electronic device according to claim 11, wherein a determination ending body calculates a final verification result based on verification results of all main bodies located in the verification area, and transmits the final verification result to other main bodies.

14. The electronic device according to claim 8, wherein the spectrum transaction comprises a plurality of spectrum transactions; and
the processing circuit is configured to calculate, according to information of each of the plurality of spectrum transactions, a size of a verification area corresponding to the spectrum transaction, and add the calculated size of the verification area to the information of the spectrum transaction.

15. The electronic device according to claim 7, wherein the spectrum management system is an ultra-dense network.

16. The electronic device according to claim 1, wherein the electronic device comprising a base station.

17. The electronic device according to claim 1, wherein the electronic device comprising a user equipment.

18. A method for wireless communication, comprising:
   causing an electronic device to verify validity of a spectrum transaction if it is determined that the electronic device is located in a validation area of the spectrum transaction, wherein the validation area is determined based on an interference caused by a spectrum acquirer in the spectrum transaction when using the transacted spectrum; and
   determining a signal to interference plus noise ratio of the electronic device based on an interference of the spectrum acquirer when using the transacted spectrum to the electronic device, and verifying the spectrum transaction to be valid in a case that the signal to interference plus noise ratio is greater than a pre-determined signal to interference plus noise ratio threshold set for the electronic device.

19. A non-transitory computer-readable storage medium storing a computer-executable instruction that, when executed by a processor, causes a method for wireless communication to be performed, the method comprising:
   causing an electronic device to verify validity of a spectrum transaction if it is determined that the electronic device is located in a validation area of the spectrum transaction, wherein the validation area is determined based on an interference caused by a spectrum acquirer in the spectrum transaction when using the transacted spectrum; and
   determining a signal to interference plus noise ratio of the electronic device based on an interference of the spectrum acquirer when using the transacted spectrum to the electronic device, and verifying the spectrum transaction to be valid in a case that the signal to interference plus noise ratio is greater than a pre-determined signal to interference plus noise ratio threshold set for the electronic device.

* * * * *